(12) United States Patent
Higgins et al.

(10) Patent No.: US 7,096,642 B2
(45) Date of Patent: Aug. 29, 2006

(54) ADHESIVE-FREE CARPET TILES AND METHODS OF INSTALLING ADHESIVE-FREE CARPET TILES

(75) Inventors: Kenneth B. Higgins, LaGrange, GA (US); Murray L. Schine, LaGrange, GA (US)

(73) Assignee: Milliken & Company, Spartanburg, SC (US)

( * ) Notice: Subject to any disclaimer, the term of this patent is extended or adjusted under 35 U.S.C. 154(b) by 186 days.

(21) Appl. No.: 10/644,189

(22) Filed: Aug. 20, 2003

(65) Prior Publication Data

US 2004/0086683 A1 May 6, 2004

Related U.S. Application Data

(60) Division of application No. 09/789,129, filed on Feb. 20, 2001, now abandoned, and a continuation-in-part of application No. 09/513,020, filed on Feb. 25, 2000, now abandoned.

(51) Int. Cl.
*E04B 5/00* (2006.01)
(52) U.S. Cl. .................. 52/747.11; 52/747.1; 52/741.1
(58) Field of Classification Search ............. 16/4–17.1; 52/741.1, 747.1, 747.11; 428/52, 62
See application file for complete search history.

(56) References Cited

U.S. PATENT DOCUMENTS

| | | | |
|---|---|---|---|
| 3,866,267 A | 2/1975 | Poletti ........................... 16/8 |
| 4,022,941 A | 5/1977 | Prokai et al. ............... 427/358 |
| 4,059,465 A | 11/1977 | Edgar et al. ................. 156/72 |
| 4,201,812 A | 5/1980 | Blanken et al. ............. 428/95 |
| 4,374,884 A | 2/1983 | Kwok et al. ................. 428/95 |
| 4,397,900 A | 8/1983 | Higgins ....................... 428/95 |
| 4,405,668 A | 9/1983 | Wald ........................... 428/40 |
| 4,438,610 A | 3/1984 | Fifer ........................... 52/263 |
| 4,515,846 A | 5/1985 | McKinney et al. .......... 428/95 |
| 4,522,857 A * | 6/1985 | Higgins ....................... 428/95 |
| 4,550,311 A | 10/1985 | Galloway et al. .......... 340/531 |
| 4,554,194 A | 11/1985 | Haas et al. .................. 428/40 |
| 4,576,665 A | 3/1986 | Machell ...................... 156/72 |
| 4,617,210 A | 10/1986 | Zybko .......................... 428/35 |
| 4,634,730 A | 1/1987 | Bogdany ................... 524/425 |
| 4,647,484 A | 3/1987 | Higgins ....................... 428/40 |
| 4,649,069 A | 3/1987 | Tone ............................ 428/82 |

(Continued)

FOREIGN PATENT DOCUMENTS

DE 1 560 755 10/1970

(Continued)

OTHER PUBLICATIONS

Database WPI, *Derwent Publications Ltd.*, London, GB; Section Ch, Week 199223, XP002169201 & JP 04 119841 A (Toray Ind. Inc.), Abstract.

(Continued)

*Primary Examiner*—Cheryl A. Juska
(74) *Attorney, Agent, or Firm*—Terry T. Moyer; Daniel R. Alexander

(57) ABSTRACT

Cushion backed carpet tiles and carpet tile installations which can be installed without adhesives are described. The carpet tiles are manufactured according to rigid specifications in order that no corner of any of the individual tiles is 1/16" or greater off the floor due to curl, and no corner on the tile has cup of greater than 3/16". In this way, a substantially to entirely adhesive-free carpet tile installation can be achieved, with the installation being capable of withstanding the rigors of a variety of typical types of wear, such as rolling traffic, etc., without shifting or snowplowing over adjacent tiles.

11 Claims, 22 Drawing Sheets

U.S. PATENT DOCUMENTS

| | | | |
|---|---|---|---|
| 4,657,790 A | 4/1987 | Wing et al. | 427/374.1 |
| 4,680,209 A | 7/1987 | Zybko et al. | 428/35 |
| 4,689,256 A | 8/1987 | Slosberg et al. | 428/95 |
| 4,696,849 A | 9/1987 | Mobley et al. | 428/95 |
| 4,702,950 A | 10/1987 | Slosberg et al. | 428/95 |
| 4,731,275 A | 3/1988 | Andersen | 428/95 |
| 4,744,194 A * | 5/1988 | Yasuyoshi | 52/747.11 |
| 4,751,130 A | 6/1988 | Grossmann et al. | 428/198 |
| 4,766,022 A | 8/1988 | Tone | 428/95 |
| 4,798,644 A | 1/1989 | Scott et al. | 156/324 |
| 4,822,658 A | 4/1989 | Pacione | 428/95 |
| 4,849,267 A | 7/1989 | Ward et al. | 428/41 |
| 4,853,054 A | 8/1989 | Turner et al. | 156/78 |
| 4,871,603 A | 10/1989 | Malone | 428/95 |
| 4,988,551 A | 1/1991 | Zegler | 428/40 |
| 4,991,307 A | 2/1991 | Higgins | 33/526 |
| 5,019,672 A | 5/1991 | Fish | 174/48 |
| 5,085,912 A | 2/1992 | Algiere | 428/67 |
| 5,102,714 A | 4/1992 | Mobley et al. | 428/95 |
| 5,104,693 A | 4/1992 | Jenkines | 427/244 |
| 5,204,155 A | 4/1993 | Bell et al. | 428/95 |
| 5,238,721 A * | 8/1993 | Nakazawa | 428/44 |
| 5,348,784 A | 9/1994 | Lampert | 428/92 |
| 5,366,779 A | 11/1994 | Thompson | 428/96 |
| 5,470,630 A | 11/1995 | Thompson | 428/95 |
| 5,499,476 A | 3/1996 | Adams et al. | 52/220.1 |
| 5,540,968 A * | 7/1996 | Higgins | 428/95 |
| 5,545,276 A | 8/1996 | Higgins | 156/79 |
| 5,558,917 A | 9/1996 | Markusch et al. | 428/95 |
| 5,654,066 A | 8/1997 | Pacione | 428/95 |
| 5,822,828 A * | 10/1998 | Berard et al. | 16/6 |
| 5,834,087 A | 11/1998 | Kajikawa et al. | 428/95 |
| 5,929,145 A | 7/1999 | Higgins et al. | 524/69 |
| 5,948,500 A | 9/1999 | Higgins | 428/95 |
| 6,162,309 A | 12/2000 | Brodeur, Jr. et al. | 156/72 |
| 6,197,400 B1 * | 3/2001 | Desai | 428/88 |
| 6,203,881 B1 | 3/2001 | Higgins | 428/95 |
| 6,397,544 B1 * | 6/2002 | Desai | 52/506.01 |
| 6,468,623 B1 | 10/2002 | Higgins | 428/95 |
| 6,849,317 B1 * | 2/2005 | Oakey et al. | 428/88 |
| 2004/0030733 A1 * | 2/2004 | Bell | 708/160 |
| 2004/0258870 A1 * | 12/2004 | Oakey et al. | 428/62 |
| 2005/0091936 A1 * | 5/2005 | Galloway et al. | 52/287.1 |
| 2006/0057328 A1 * | 3/2006 | Pacione et al. | 428/95 |

FOREIGN PATENT DOCUMENTS

| | | | |
|---|---|---|---|
| DE | 2 310 970 | | 9/1974 |
| EP | 0 005 050 | | 10/1979 |
| EP | 0 048 986 | | 4/1982 |
| EP | 0 309 816 | | 4/1989 |
| EP | 364324 A | * | 4/1990 |
| FR | 2 303 136 | | 3/1976 |
| GB | 2299019 A | * | 9/1996 |
| JP | 11270115 A | * | 10/1999 |
| NL | 8203180 | | 3/1984 |
| SE | 476891 | | 9/1969 |
| WO | 95/23691 | | 9/1995 |

OTHER PUBLICATIONS

Database WPI, *Derwent Publications Ltd.*, London, GB; Section Ch, Week 199223, XP002169200 & JP 04 119842 A (Toray Ind. Inc.), Abstract.

* cited by examiner

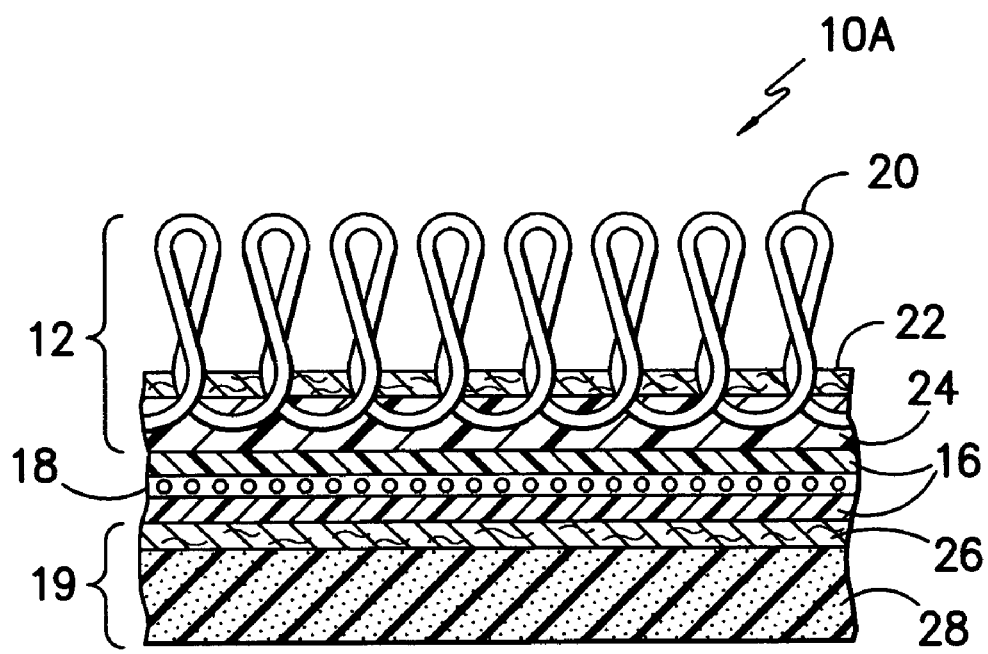
FIG. -1A-
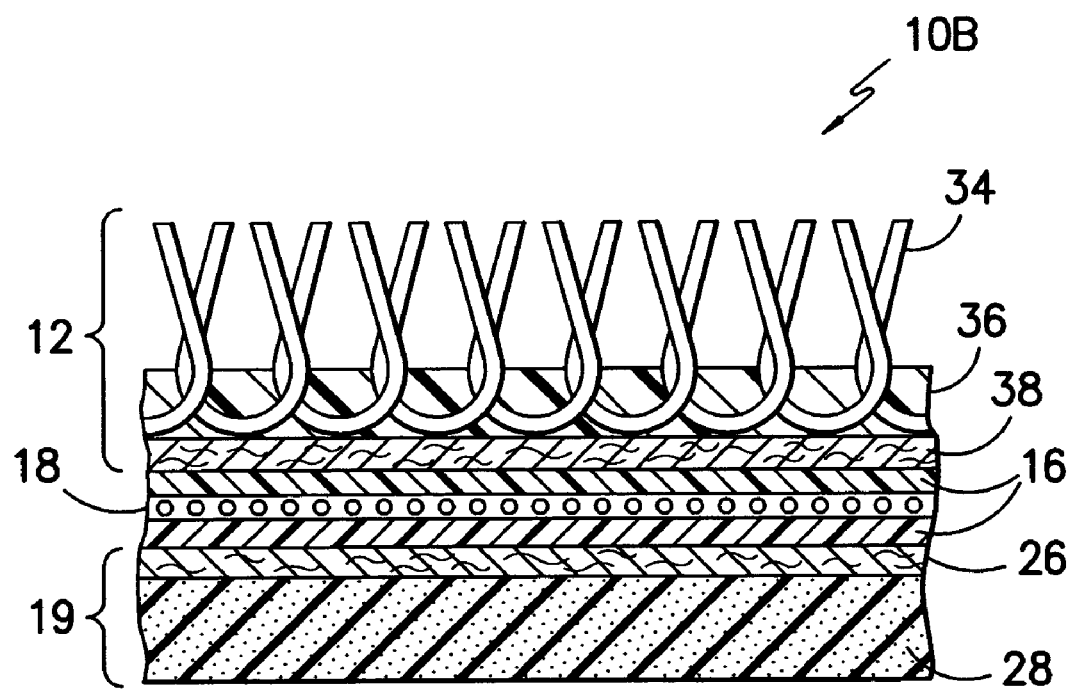
FIG. -1B-

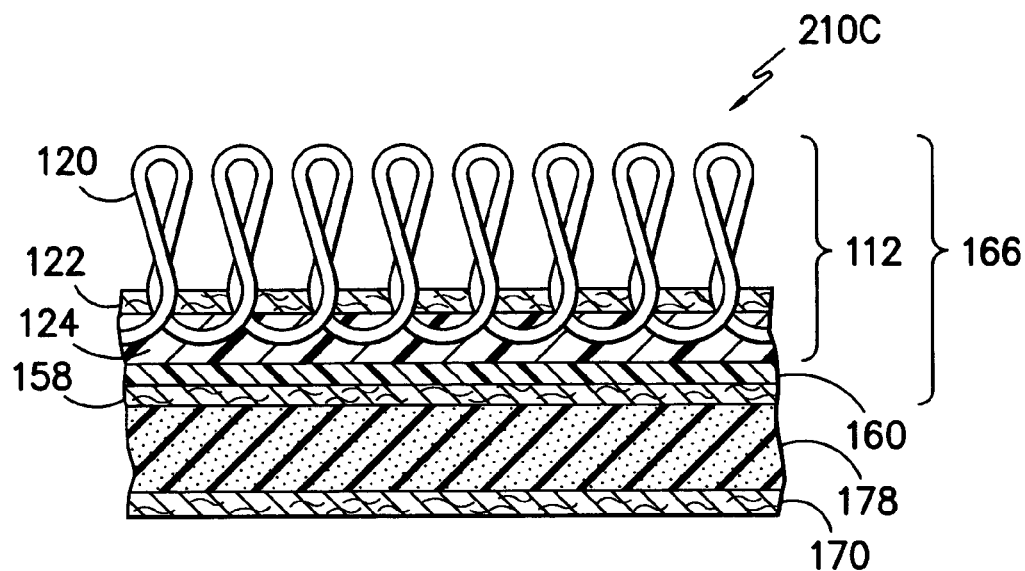
FIG. -1C-
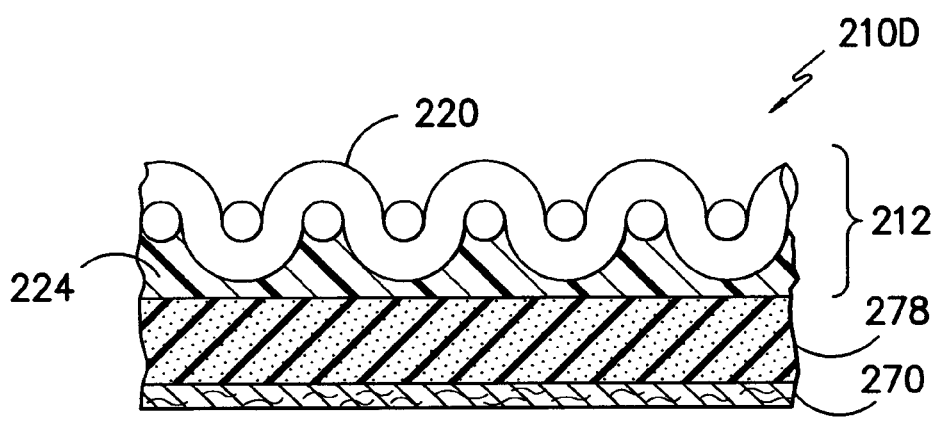
FIG. -1D-
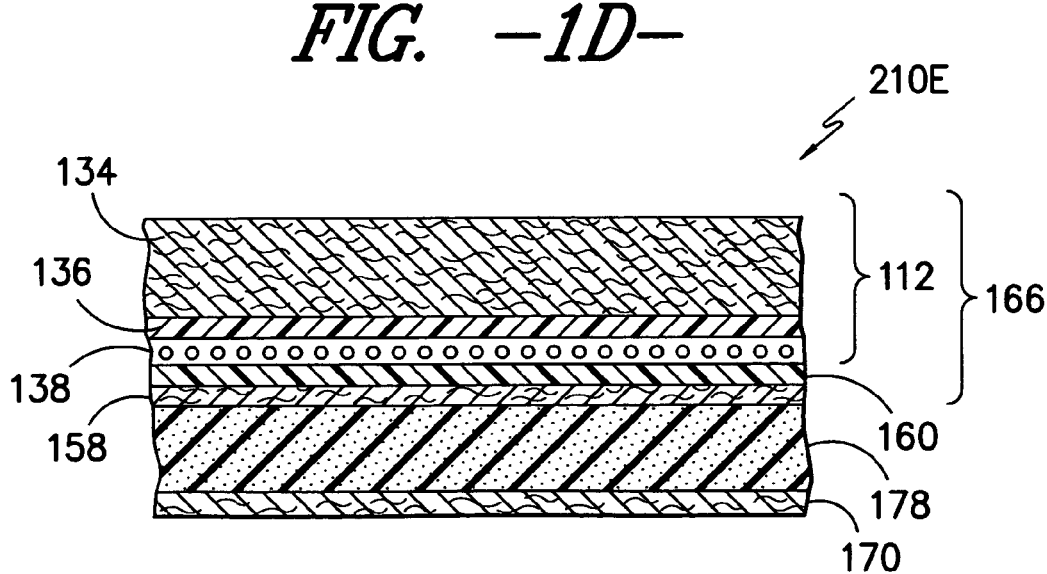
FIG. -1E-

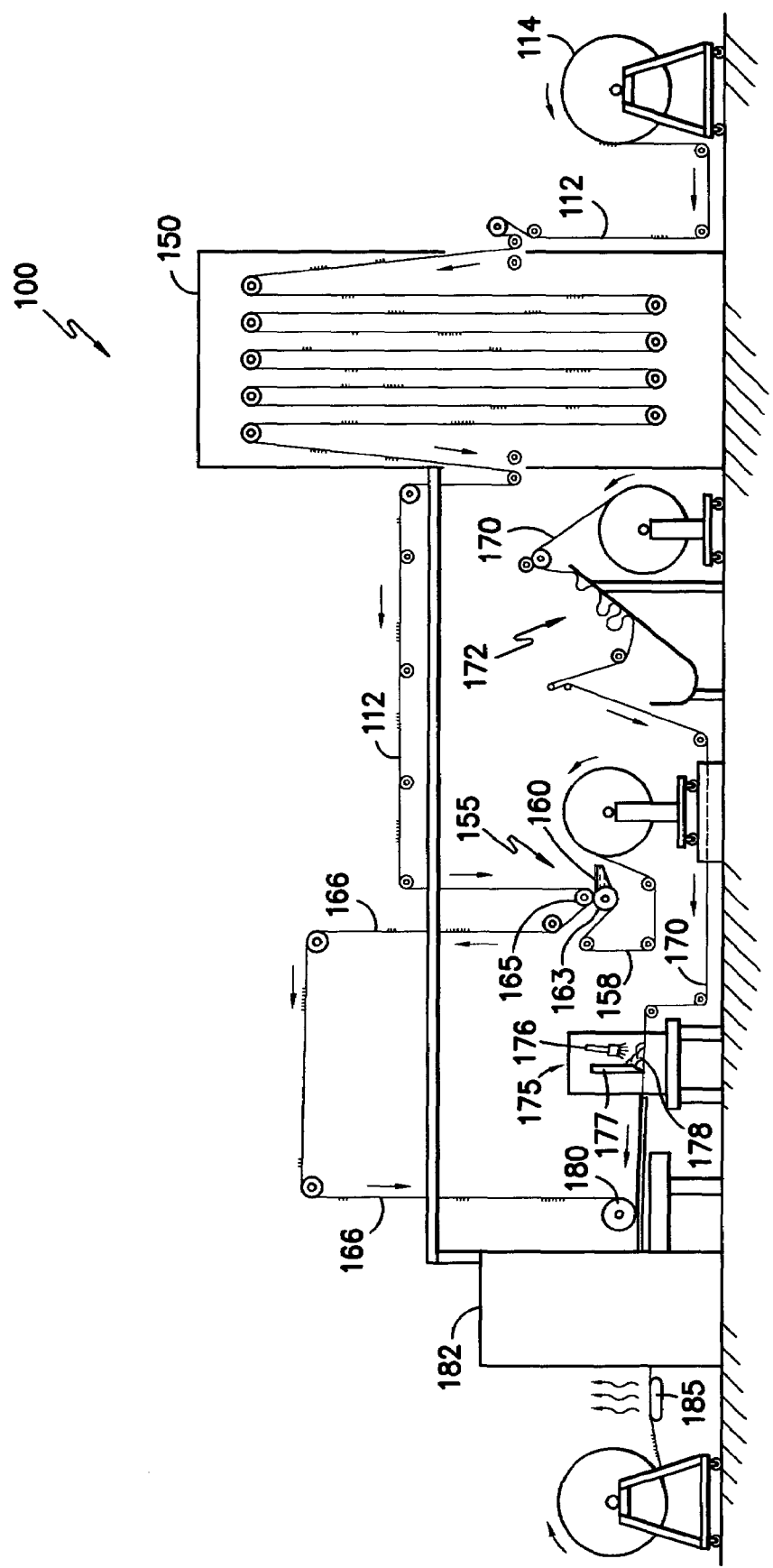
FIG. -2-

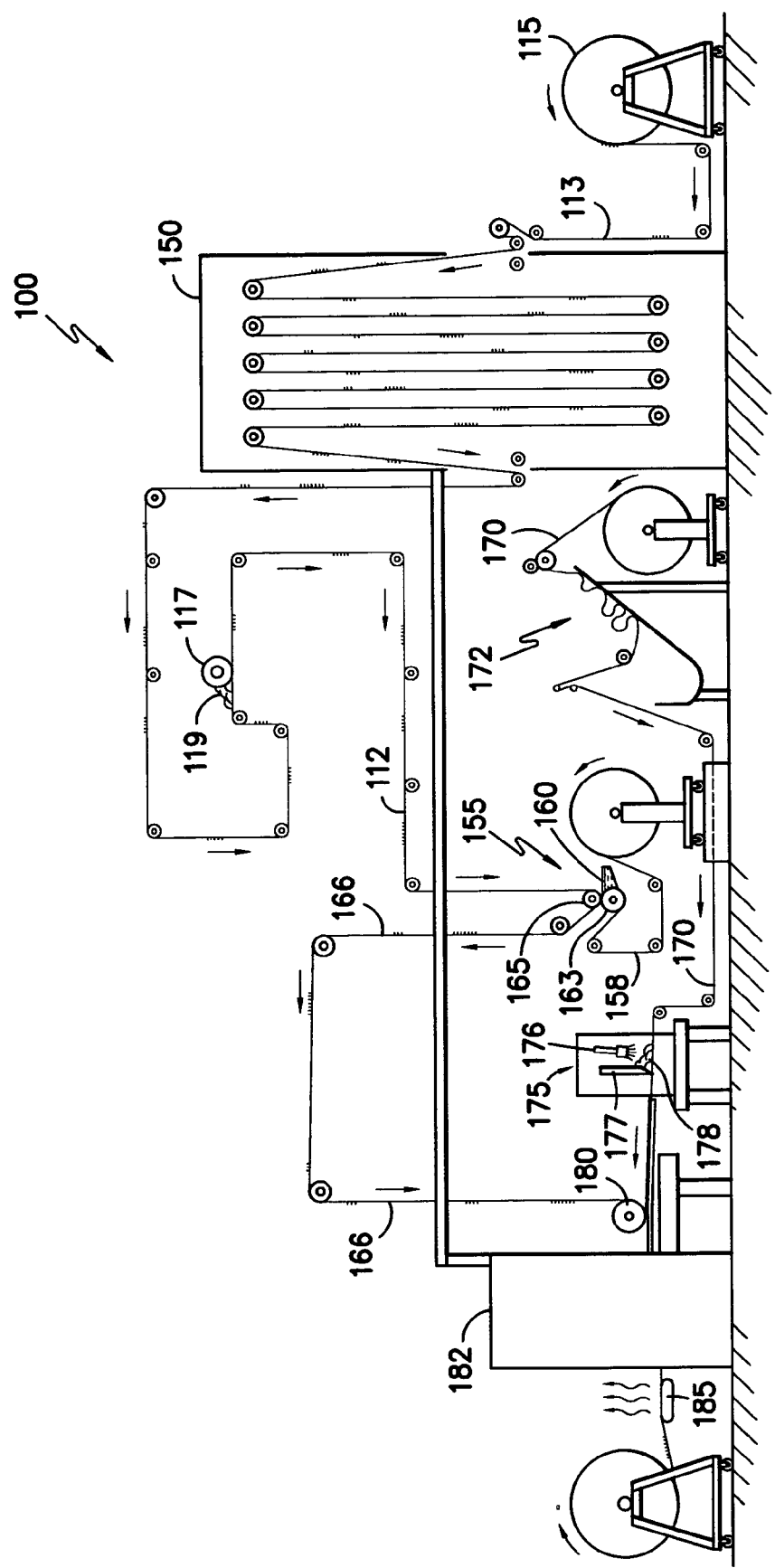
FIG. -2A-

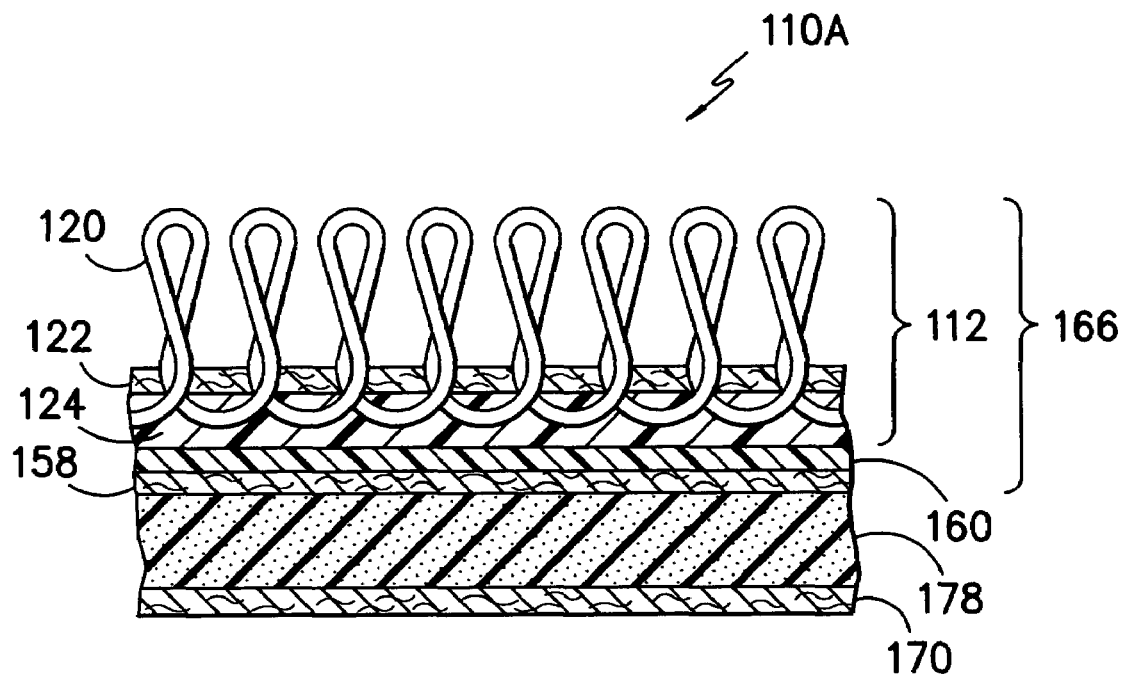
FIG. -3A-
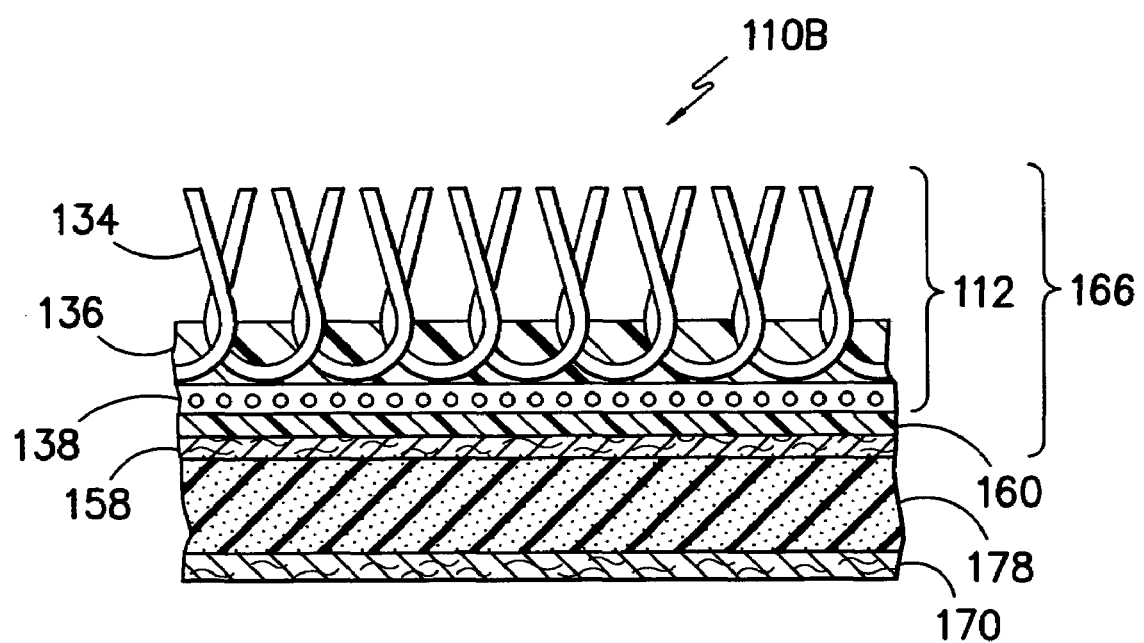
FIG. -3B-

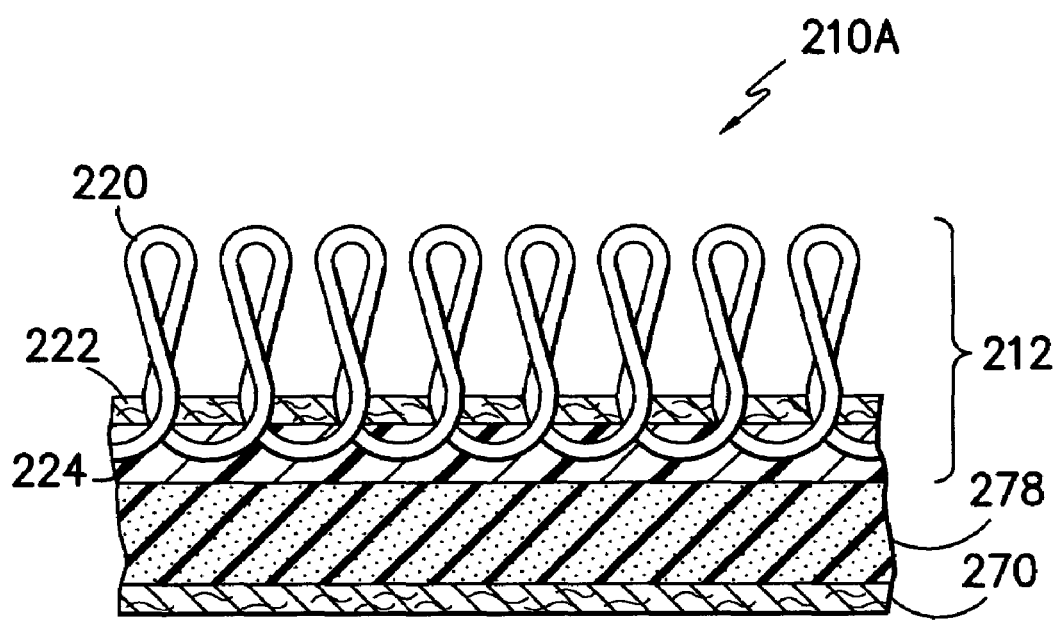
FIG. -4A-
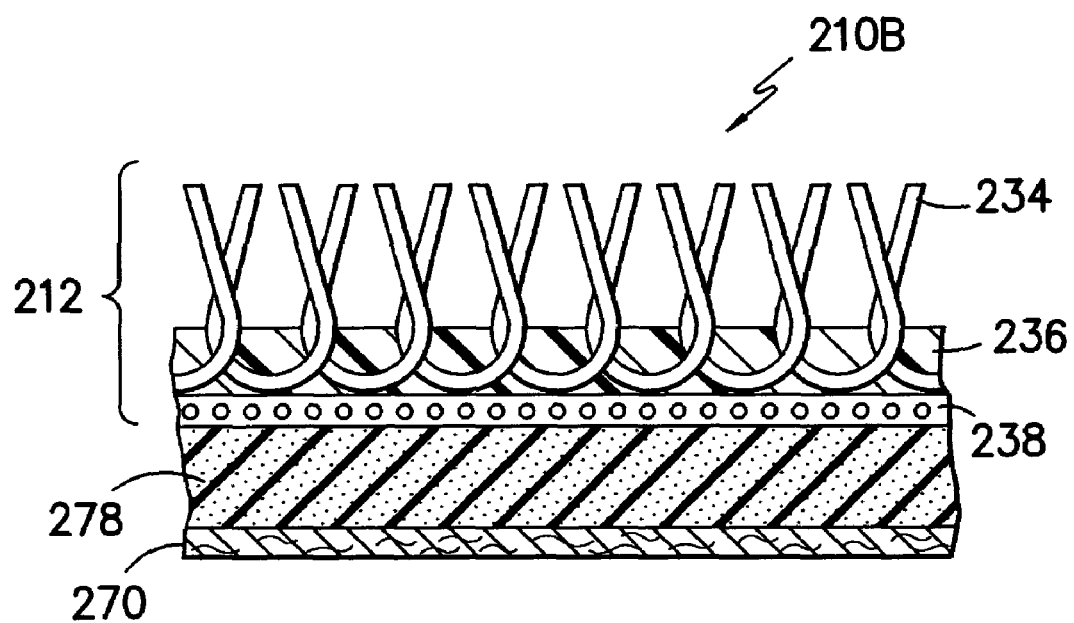
FIG. -4B-

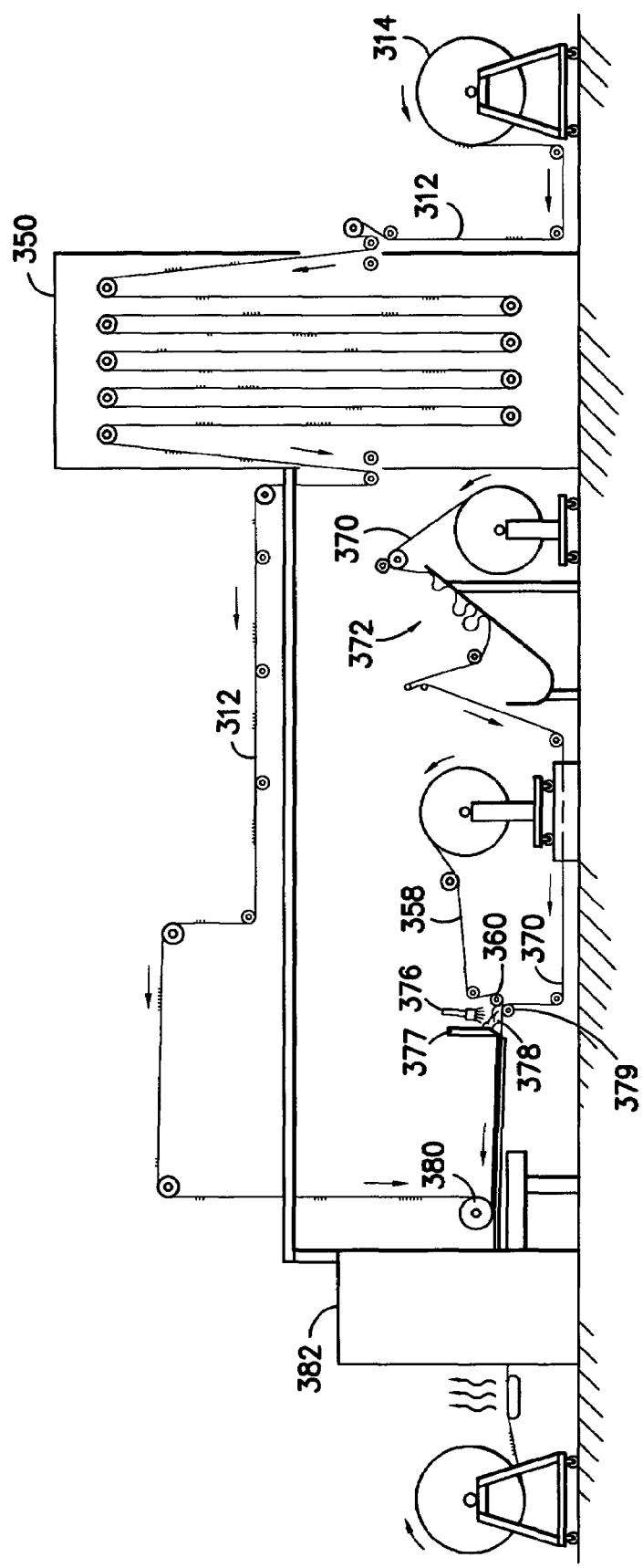
FIG. -5-

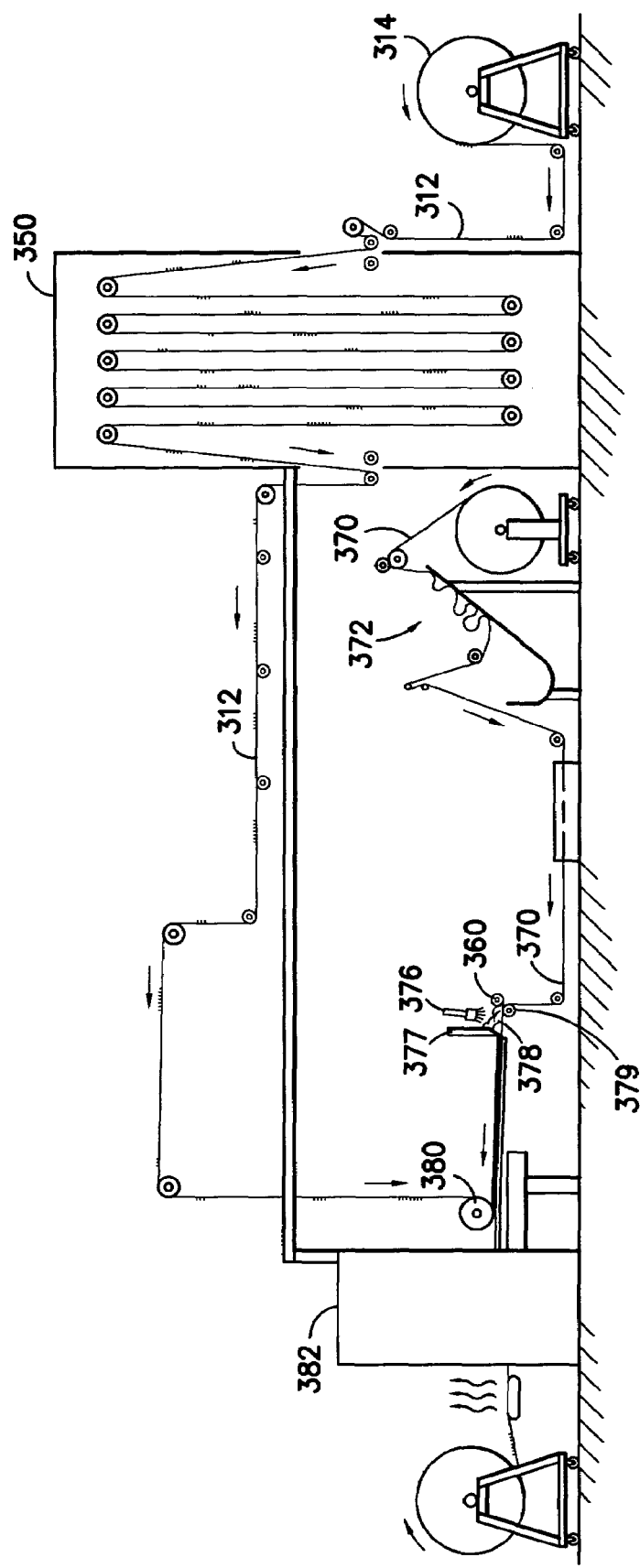
FIG. -5A-

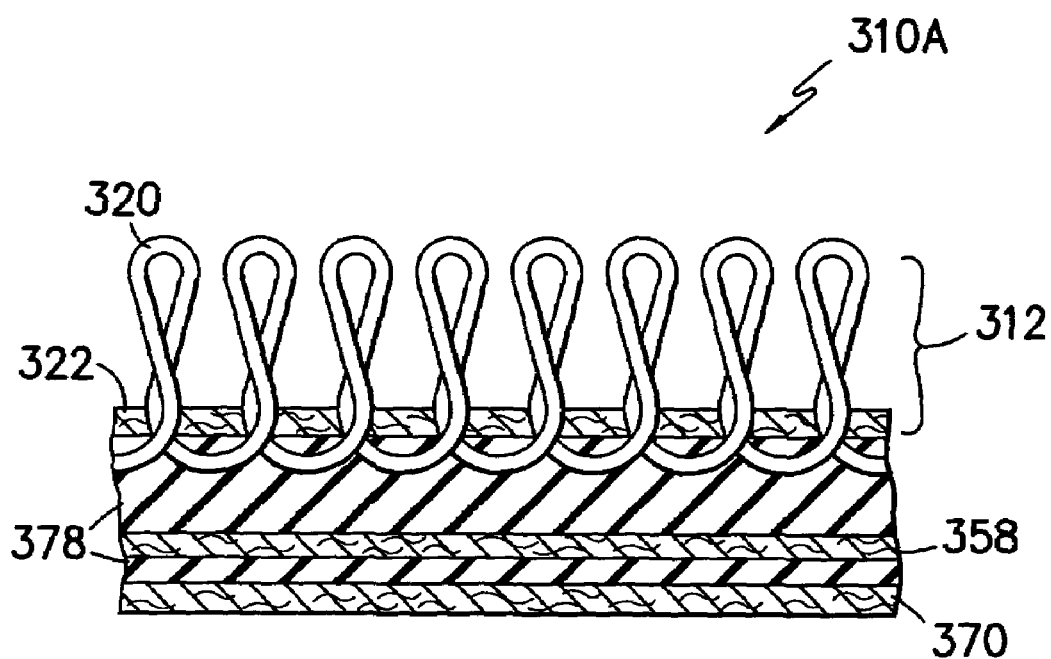
FIG. -6A-
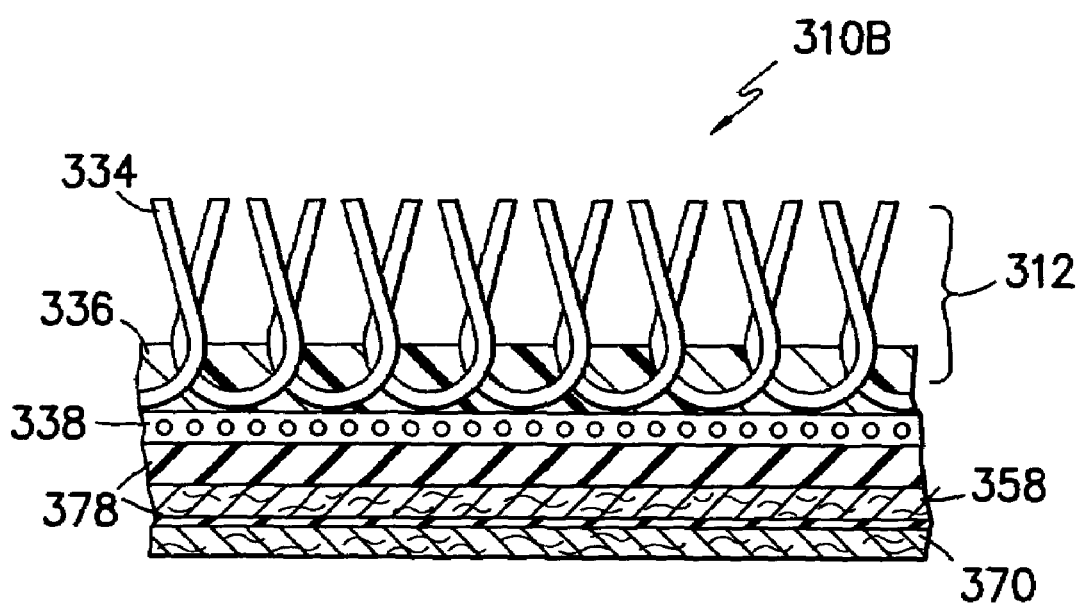
FIG. -6B-

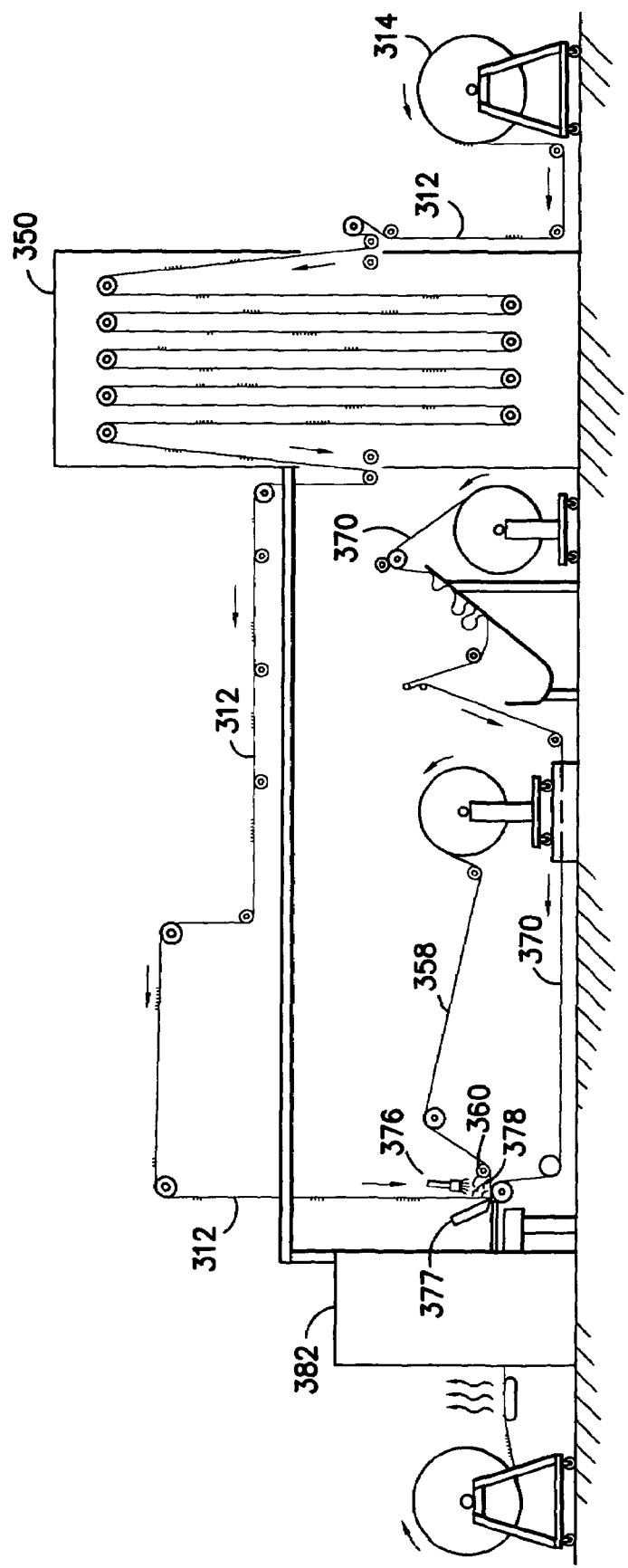
FIG. -7-

FIG. -8A-
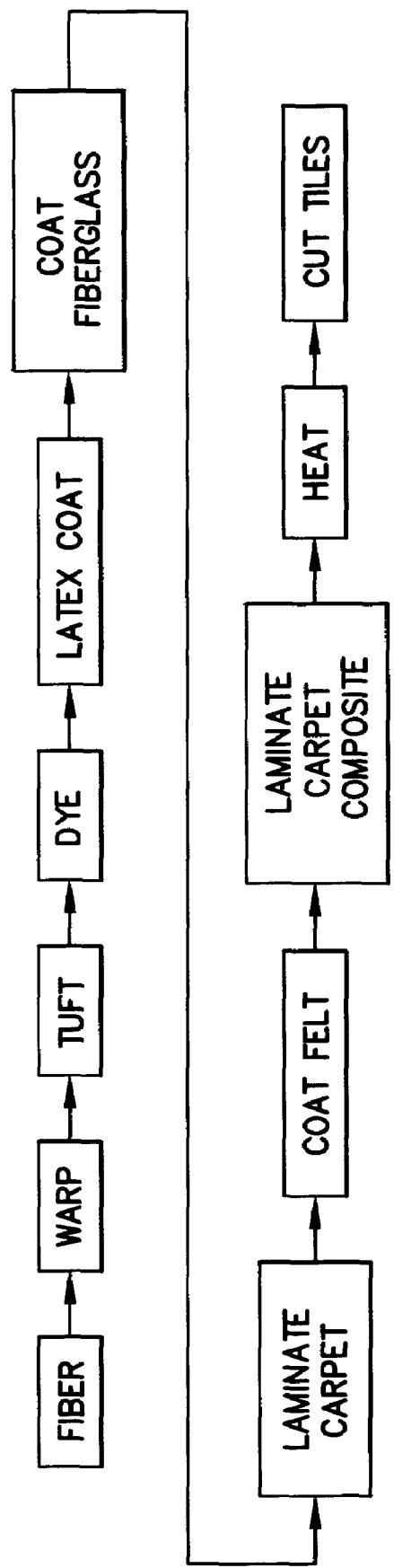
FIG. -8B-

| FIBER | FIBER | FILAMENT | DENIER | PLY | TWIST | AIR ENTANGLE | HEATSET |
|---|---|---|---|---|---|---|---|
| UPPER SETTING | NYLON T-6,6 OR T6 | BCF | 1700 | 3 | 4 x 4 | YES | YES |
| MOST LIKELY SETTING | NYLON T-6,6 OR T6 | BCF | 1360 | 1 | NONE | NONE | NONE |
| LOWER SETTING | POLYPROPYLENE | STAPLE | 1120 | 1 | NONE | NONE | NONE |

| WARP | ENDS |
|---|---|
| UPPER SETTING | 1800 |
| MOST LIKELY SETTING | 1512 |
| LOWER SETTING | 576 |

| TUFT | TYPE | CREEL | GAUGE | PILE HEIGHT | STITCHES/in |
|---|---|---|---|---|---|
| UPPER SETTING | CUT | BEAM | 5/64" | 16/64" | 18 |
| MOST LIKELY SETTING | LOOP | BEAM | 1/10" | 10/64 & 13/64 | 14.39 |
| LOWER SETTING | LOOP | CREEL | 1/8" | 8/64" | 10 |

| DYE | | | | | PRIMARY BACKING | PRIMARY FIBER | TUFTED WEIGHT |
|---|---|---|---|---|---|---|---|
| UPPER SETTING | SCOUR | VACUUM | WET OUT | DESIGN | NON-WOVEN | POLYESTER | 15 oz/yd² |
| MOST LIKELY SETTING | H₂O 180F | 12 in Hg | 100° wpu | DYE INJECTION | WOVEN | POLYPROPYLENE | 12.34 oz/yd² |
| LOWER SETTING | H₂O 155F | 10 in Hg | 80° wpu | DYE INJECTION | WOVEN | POLYPROPYLENE | 8 oz/yd² |
| | H₂O 120F | 6 in Hg | 50° wpu | TUFTED DESIGN | | | |

| COAT | LATEX TYPE | LATEX ADD ON | LATEX OVEN | CURE | FELT FIBER | FELT CONSTRUCTION | HOTMELT ADHESIVE | FIBERGLASS | POLYURETHANE ADD ON | POLYURETHANE THICKNESS | POLYURETHANE DENSITY |
|---|---|---|---|---|---|---|---|---|---|---|---|
| UPPER SETTING | SBR | 20 oz/yd² | 320F | 360F | POLYESTER | NON-WOVEN | 50 oz/yd² | 4 oz/yd² | 30 oz/yd² | 0.12 INCHES | 18 lb/ft² |
| MOST LIKELY SETTING | SBR | 16 oz/yd² | 300F | 330F | PE & PP | NON-WOVEN | 42 oz/yd² | 2 oz/yd² | 20 oz/yd² | 0.06 INCHES | 16 lb/ft² |
| LOWER SETTING | EVA | 12 oz/yd² | 280F | 300F | POLYPROPYLENE | WOVEN | 36 oz/yd² | 1.5 oz/yd² | 10 oz/yd² | 0.04 INCHES | 14 lb/ft² |

| COAT | FLUOROCHEM | TILE SIZE |
|---|---|---|
| UPPER SETTING | DRY | 1 METER |
| MOST LIKELY SETTING | 0.16 oz/yd² / 300F | 36 INCH |
| LOWER SETTING | 0.08 oz/yd² / 270F | 18 INCH |
| | 0.04 oz/yd² / 210F | |

FIG. -9-

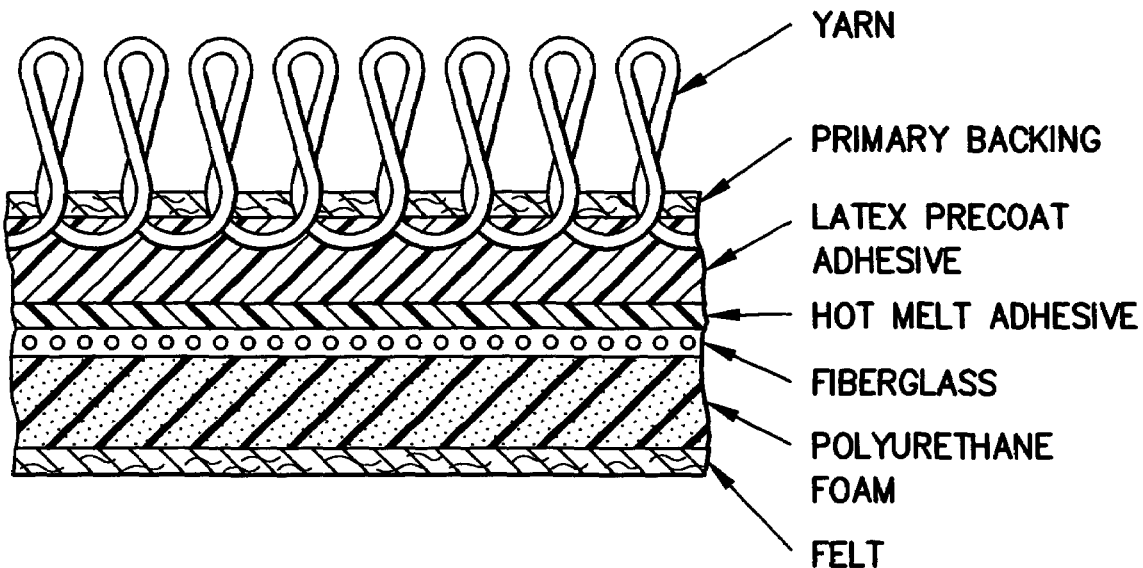
FIG. -10A-
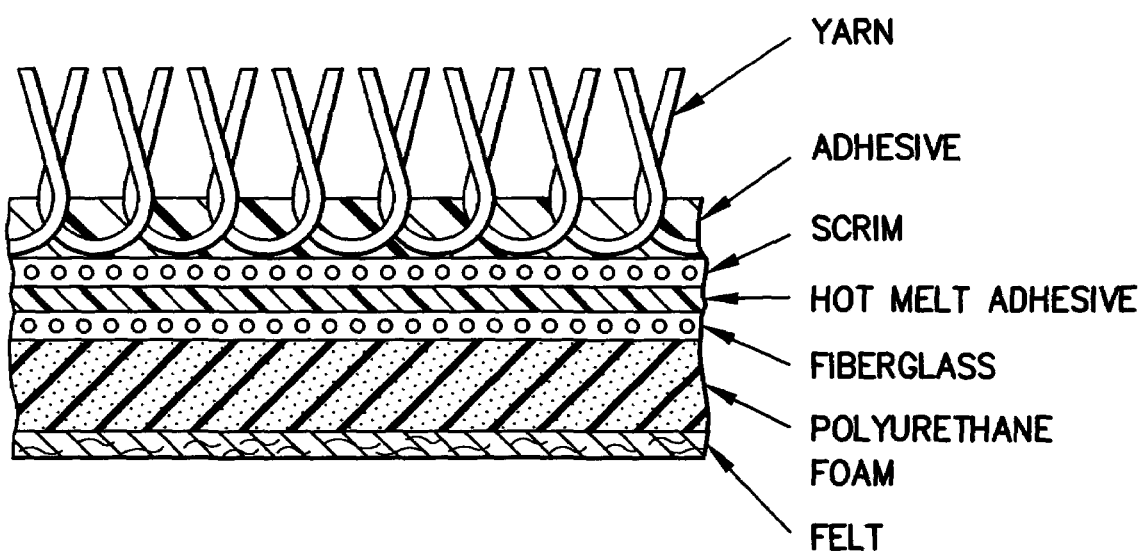
FIG. -10B-

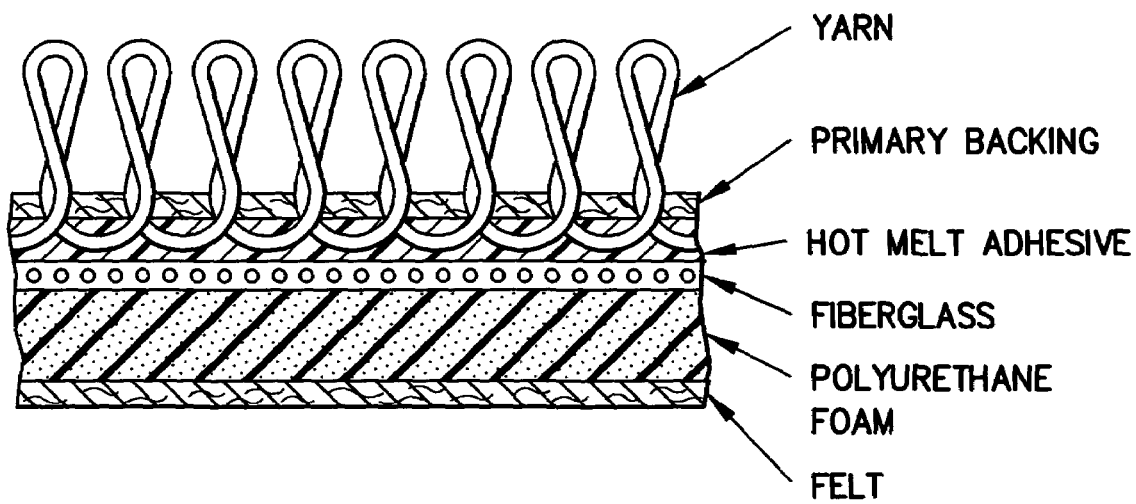
FIG. -11-
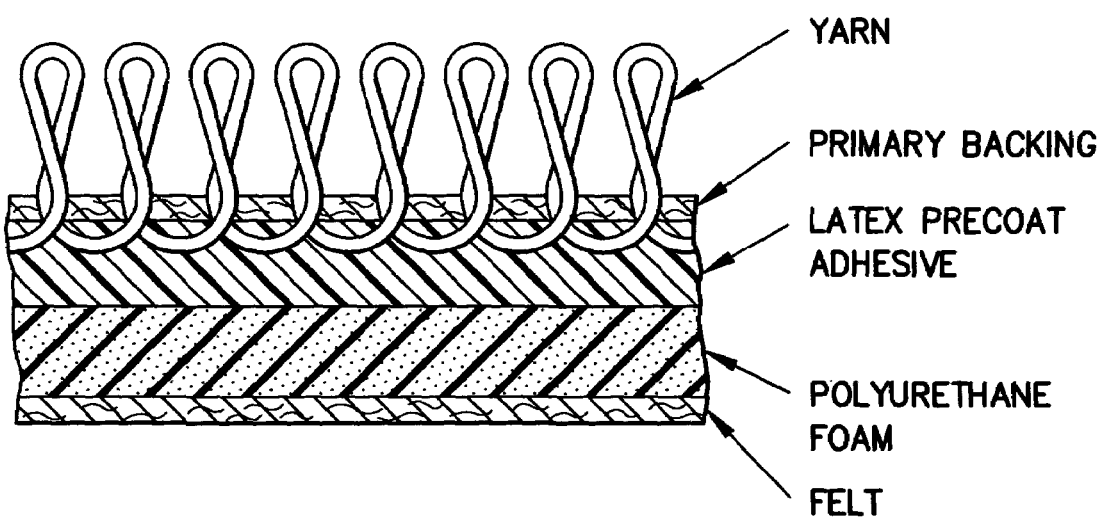
FIG. -12-

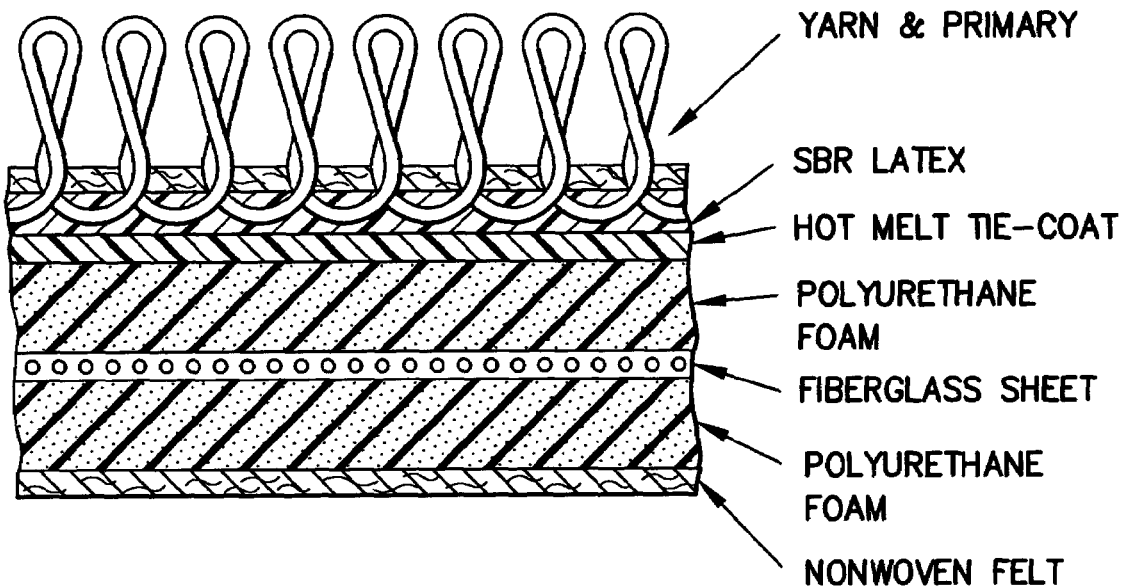
FIG. -13-
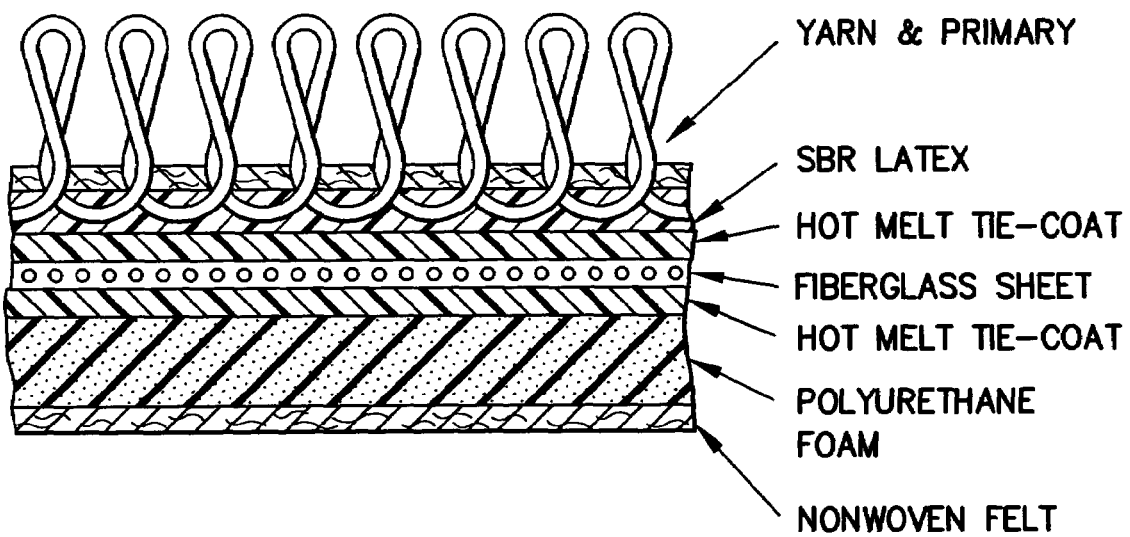
FIG. -14-

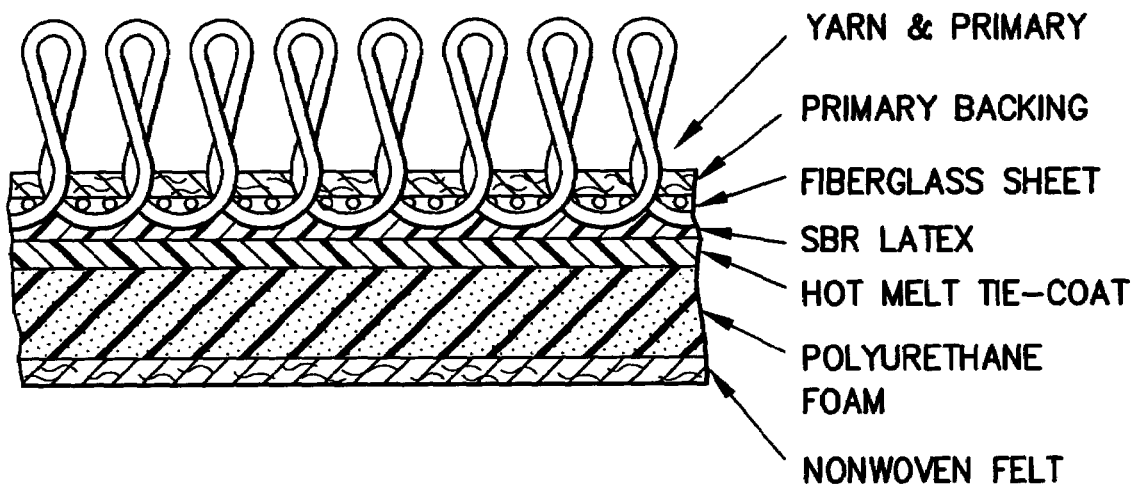
FIG. -15-
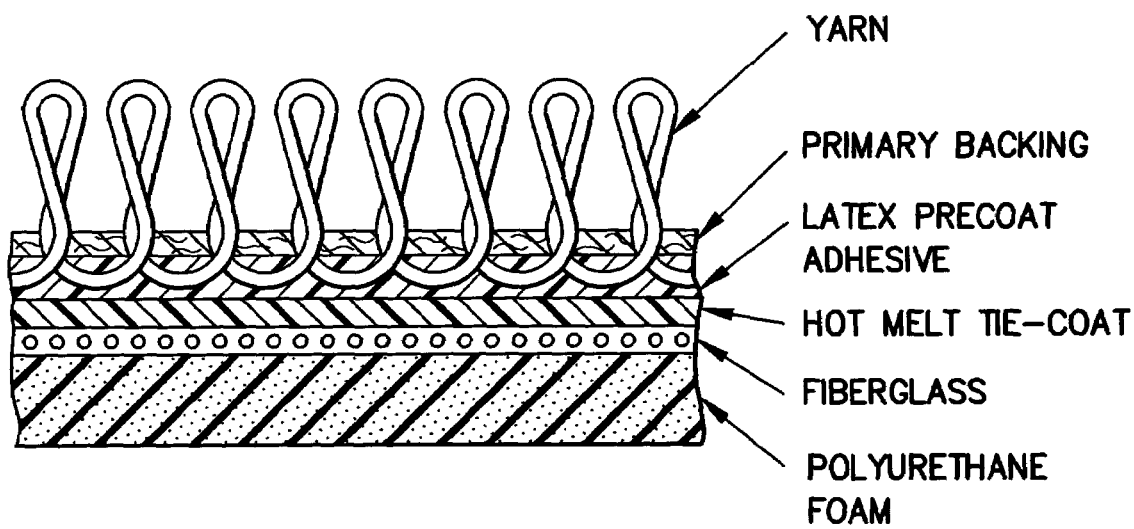
FIG. -16-

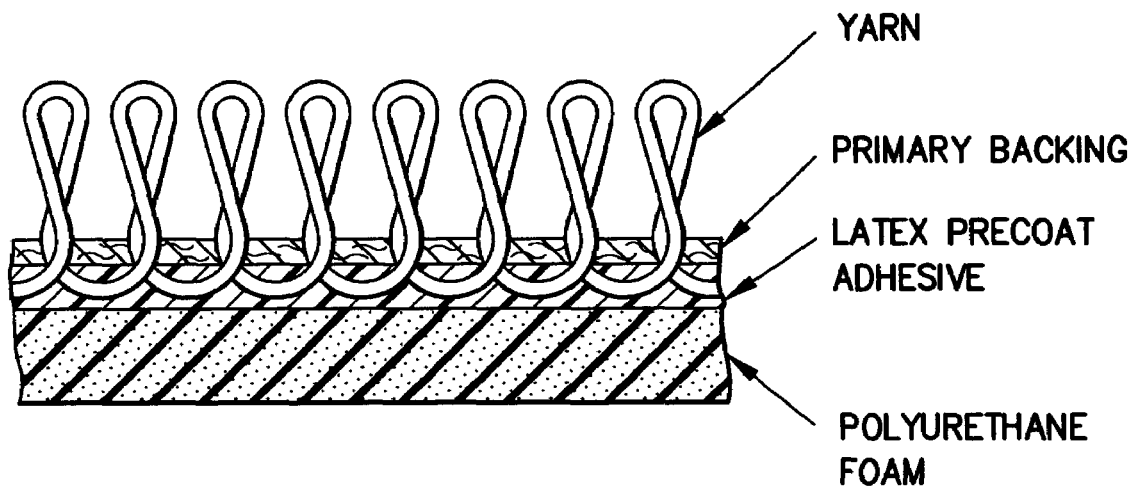
FIG. -17-
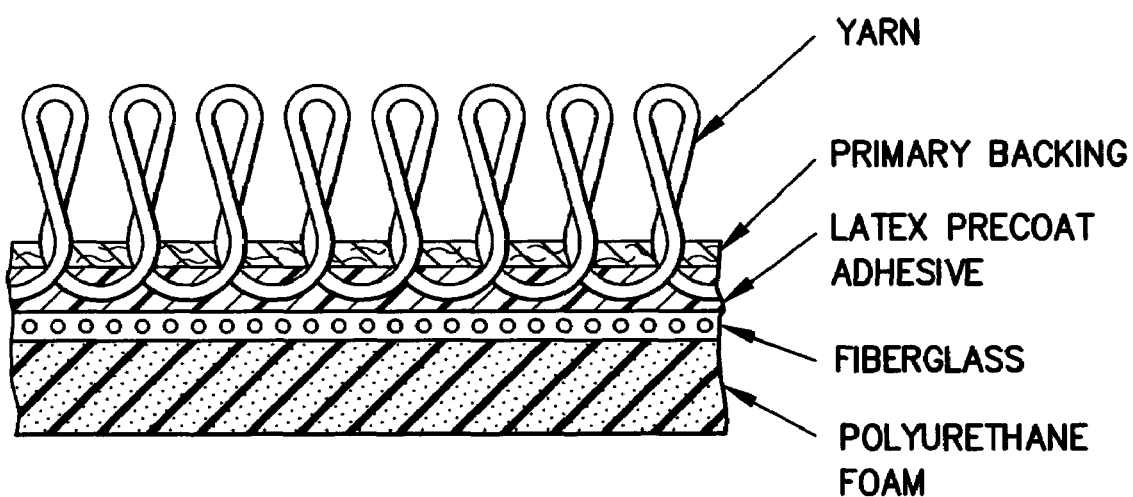
FIG. -18-

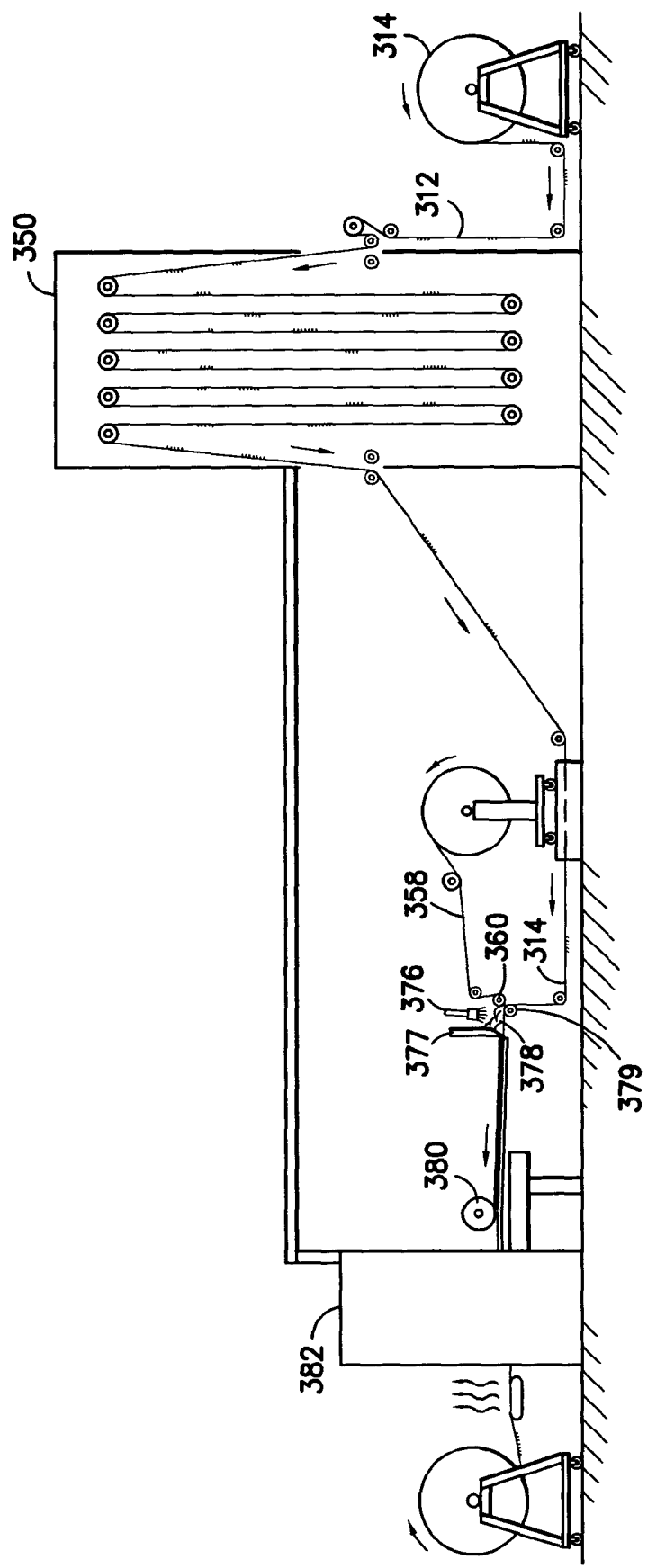

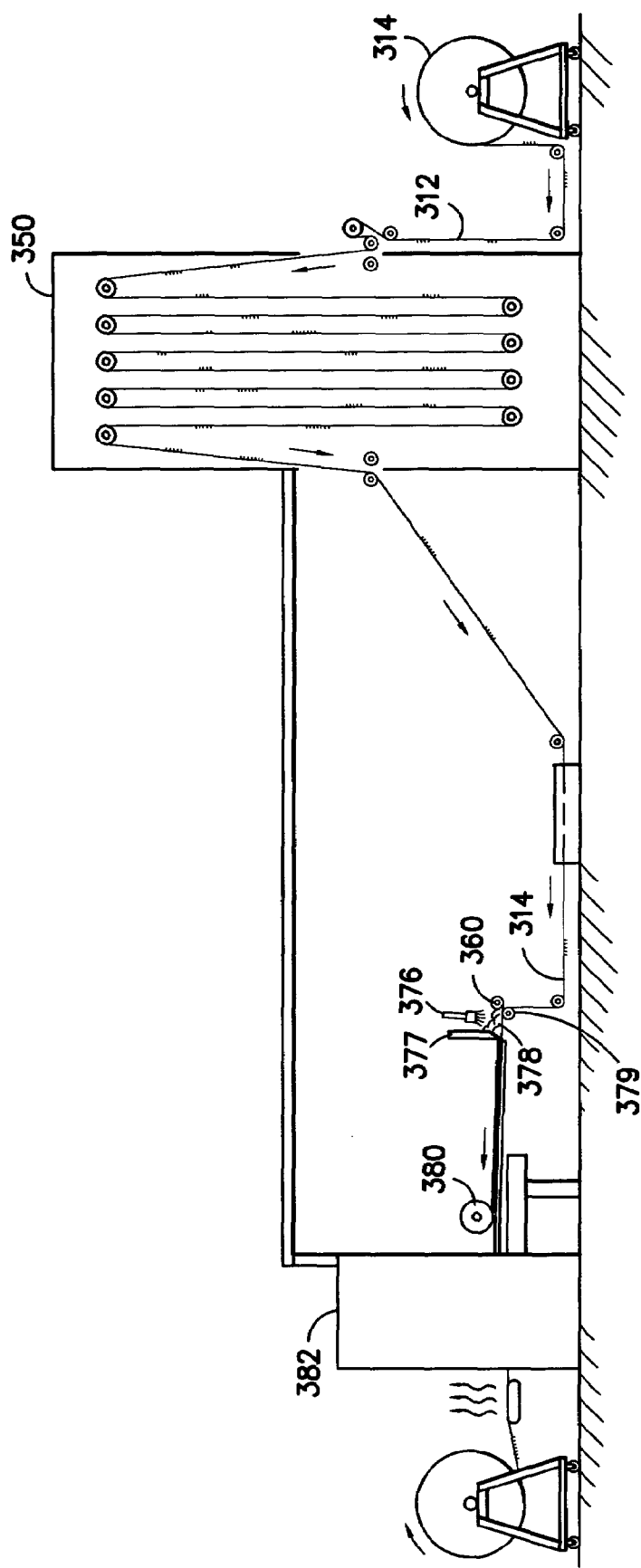
FIG. -19A-

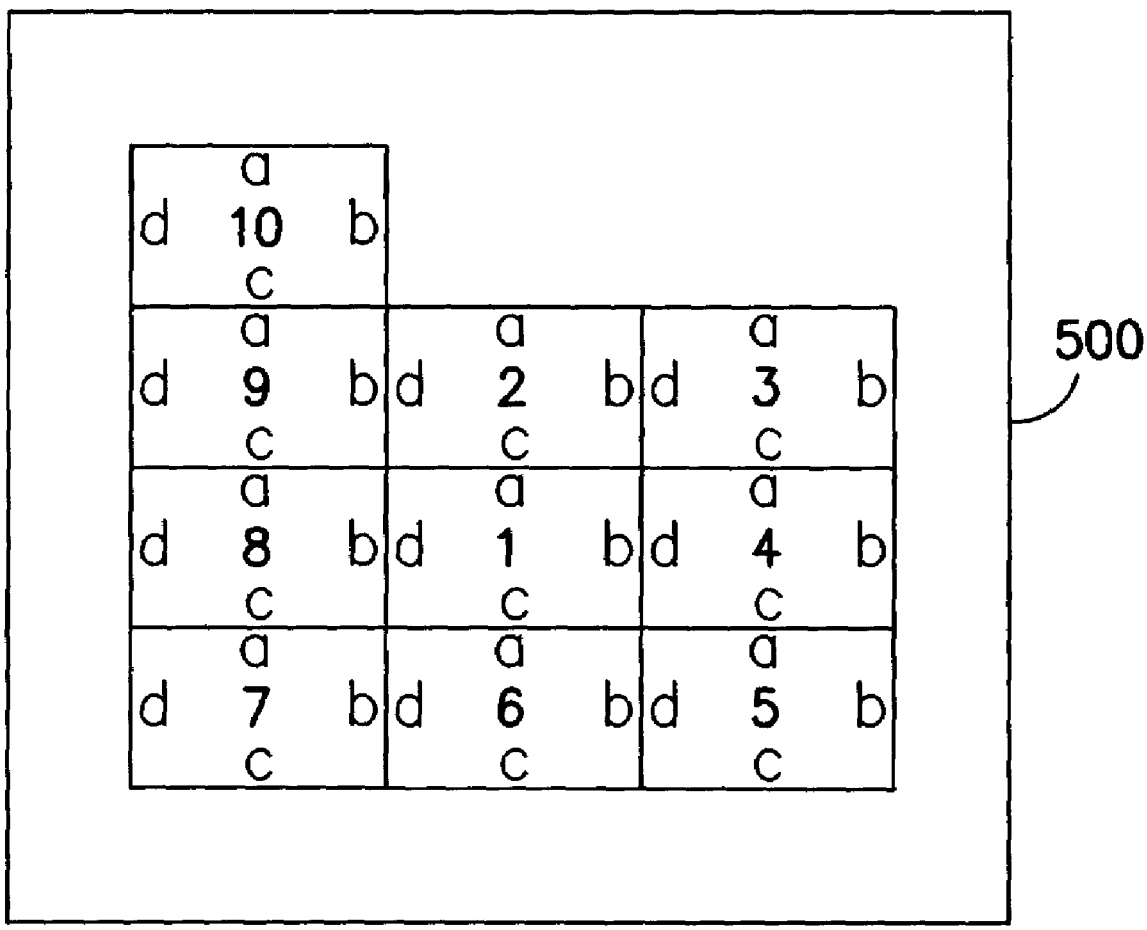
FIG. -20-

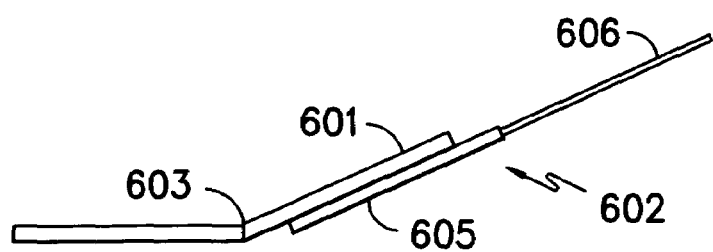
FIG. −21a−
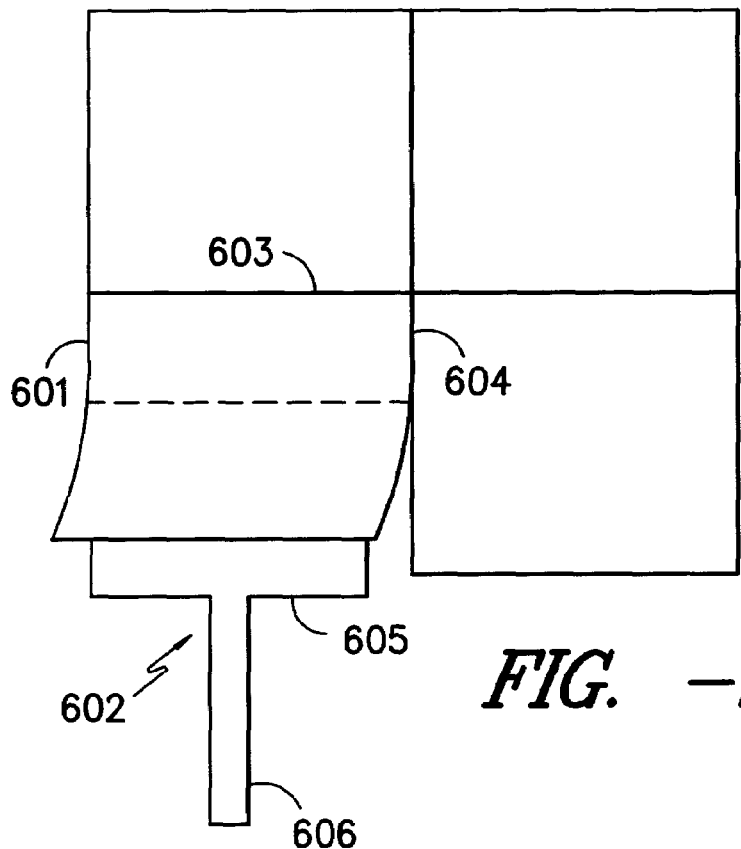
FIG. −21b−
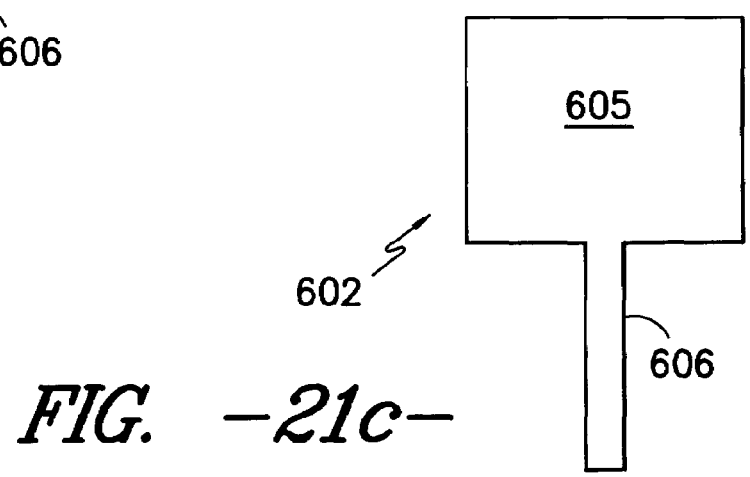
FIG. −21c−

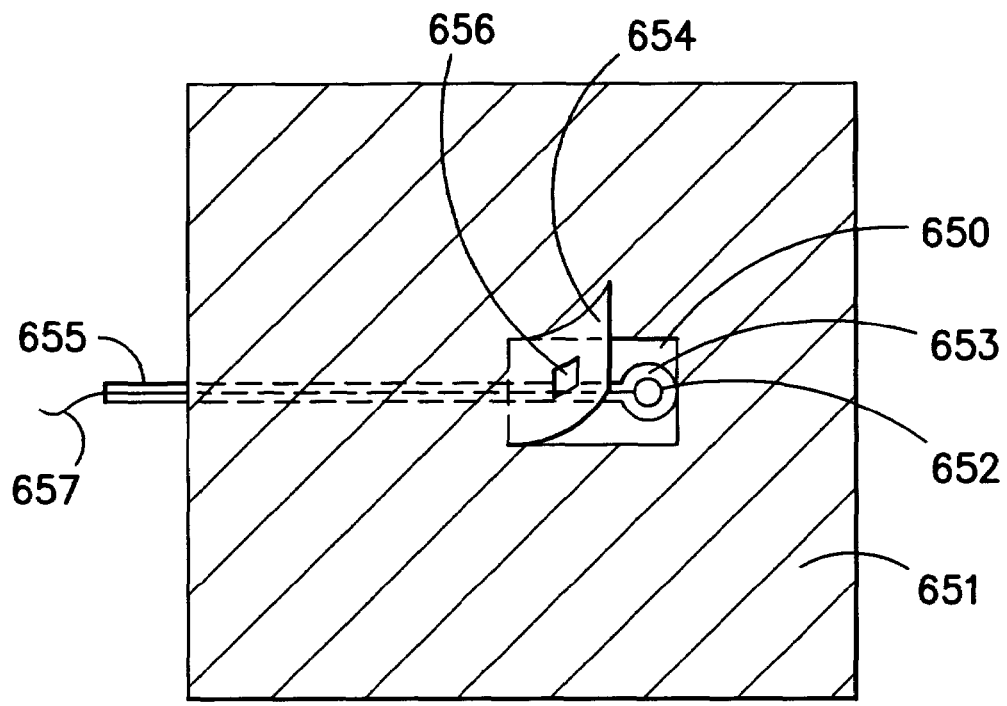
*FIG. -22-*
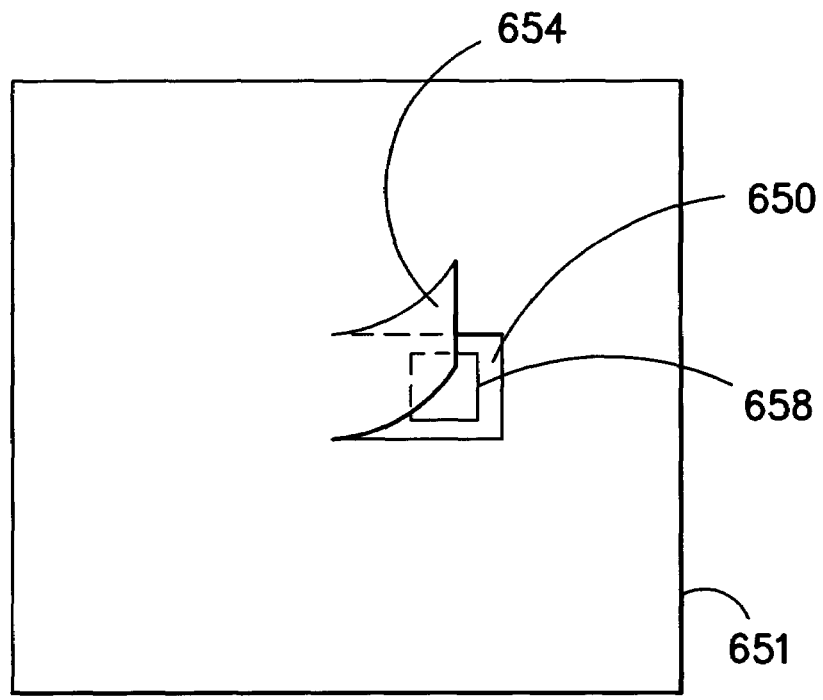
*FIG. -23-*

ADHESIVE-FREE CARPET TILES AND METHODS OF INSTALLING ADHESIVE-FREE CARPET TILES

CROSS-REFERENCE TO RELATED APPLICATIONS

This application is a Divisional of U.S. patent application Ser. No. 09/789,129, filed Feb. 20, 2001 now abandoned and is a Continuation-In-Part of U.S. patent application Ser. No. 09/513,020, filed Feb. 25, 2000 now abondoned. Priority to and benefit of such prior applications is hereby claimed and the contents of such prior applications are hereby incorporated herein by reference in their entirety.

FIELD OF THE INVENTION

The invention generally relates to cushion on foam backed carpet tile installations which can be installed with minimal or no adhesive, the cushion or foam backed carpet tiles used for the installations and the methods associated with the use of low or no adhesive cushion or foam backed carpet tiles. More specifically, the invention relates to cushion backed carpet tile installations which are substantially freely laid with minimal or no adhesive, yet which retain their position throughout the rigors of use, and which can withstand rolling traffic without undesirable lateral shifting.

BACKGROUND OF THE INVENTION

Carpet tile assemblies are widely used as floor coverings, as they provide a number of advantages over their broadloom counterparts. Because such tiles are provided in relatively small dimensions, e.g. generally in the form of 18 inch by 18 inch, or 36 inch by 36 inch squares, they can be used to achieve a variety of visual design effects. In addition, the lifespan of the overall floor covering can be increased, as individual tiles that become stained or damaged can be repaired of replaced without the need for replacement of the entire floor covering.

In addition, the installation of carpet tiles can in some cases be preferable to the installation of broadloom (i.e. wall-to-wall type) carpet, since the tiles can be selected and cut to conform to corners and irregularities in the floor dimension. In contrast, it can often be difficult to cut a large piece of broadloom to exact conformance with the room, since it can be difficult to integrate a number of irregularities or corners at once. Furthermore, because it is generally considered to be desirable to minimize the number of seams in a broadloom carpet installation, it is often the case that the largest piece of broadloom carpet available for use in a particular room installation is selected. This can present challenges with respect to storage and transport in addition to the obvious difficulties associated with working with a large piece of material during installation.

However, heretofore in actual practice it has not been possible to fully maximize the advantages associated with carpet tiles. Specifically, conventional methods for the installation of carpet tiles require the use of relatively strong adhesives to bond the tiles to the existing floor structure. In one common installation method, the installer coats the floor with an adhesive, allows the adhesive to set up, then secures the tiles to the floor by pressing them onto the adhesive. Typically, this involves spreading a layer of adhesive over the entire floor surface.

As will be readily apparent to those of ordinary skill in the art, this method requires that the installer sit or stand on the installed tiles., since he cannot step on the adhesive-covered floor. This can result in inadvertent slipping of the tiles as the adhesive is curing due to shifts in the installer's body weight as he reaches to install the next tile. This can in turn lead to irregularities in the appearance of the installation. In addition, the process can be awkward since the installer is forced to pull the tiles into position, and can result in a failure to achieve a tight junction between adjacent tiles. Furthermore, this method makes it possible for the carpet tiles to become damaged or soiled by the installer as they are installed. Therefore, the skill of the installer can be a critical factor in the overall quality and look of the carpet tile installation.

A further difficulty associated with the use of adhesively attached tiles is that the wet adhesives typically include volatile organic compounds (VOCs). To reduce any potential health risks to the installer from breathing too many fumes, it is generally considered to be important to insure that the installation environment has adequate ventilation to remove the adhesive fumes.

A further disadvantage of adhesive installed carpet tiles is the cost associated with the adhesive material and the time and manpower associated with the application of the adhesive. There is also a cost associated with the inefficient recycle, refurbishment or reuse of the tiles since many carpet tiles are damaged during removal and must be discarded by land filling, incineration or other methods none of which are environmentally desirable.

To overcome the problems associated with the installation of carpet tiles using wet adhesives, it has been proposed to provide the tiles with a pre-coat of adhesive, which is protected by a release sheet. While eliminating some of the problems associated with VOCs and the like, this method presents several of its own disadvantages not the least of which is added material costs and production costs.

Also, the release sheets, which are generally in the form of a coated paper sheet, must be disposed of following their removal from the squares. In addition, if a portion of the release sheet on a tile comes loose, the underlying surface of the tile bottom surface can lose its adhesive capabilities, meaning that the tile will not be fully secured to the floor structure about the entire dimension of the tile. This can particularly become an issue when the tiles must be cut to accommodate corners of a room or other irregularities in the room dimension. Similarly, if a portion of a release sheet comes loose from a tile prematurely, the adhesive can stick to an adjacent tile, which can result in damage to one or both of the tiles when the tiles are subsequently separated.

The use of a pre-coat adhesive does not mitigate the cost associated with materials or the problems associated with carpet tiles which are damaged upon removal of adhesive attached tiles.

A further disadvantage associated with the two above-described adhesive and pre-cost installation methods is that they require that the flooring to which the carpet tiles are to be secured be extremely clean and dry. Any dirt, dust or other foreign matter present (as well as flooring irregularities) can interfere with proper adhesive attachment of the carpet tile.

In addition, the removal of the adhesively-attached tiles presents problems in itself. In some cases, removal of the tiles can result in damage to or destruction of the tiles (or floor); this is particularly disadvantageous in view of the emerging methods for recycling and refurbishing used carpet tiles, which require that the tiles be substantially undamaged for them to be available for further processing. In addition, adhesive material that remains on the rear surface of carpet tiles can adversely affect the appearance of the refurbished tiles.

Such residual adhesive also presents problems for the flooring to which the tiles were attached, as it can be difficult as well as labor intensive to remove all of the adhesive. In fact, some property owners are hesitant to install carpet tiles, out of concern over the effects of the adhesive on the existing flooring when the tiles are removed. This is a particular problem if carpet tiles are to be used most efficiently. One great advantage to carpet tiles is the ability to replace individual tiles instead of the entire carpet. If a single tile, or a small section of tiles, is removed it is extremely difficult to clean the adhesive remaining on the floor without deleterious effects on the remaining tiles. This has thwarted efforts to expand the usage of carpet tiles since a major advantage is diminished by the remaining adhesive.

Carpet tiles are generally provided in the form of squares of carpeting material secured to a relatively thin, rigid backing, which is designed to assist the tile in remaining flat on the floor. Because the individual tiles have relatively small perimeter dimensions, a body traveling across a carpet-tiled expanse comes into contact with a number of tile edges at the junctures of adjacent tiles. Similarly, a body rolled across a carpet-tiled expanse results in the individual tiles contacted being subjected to lateral forces, which can cause a tile to press laterally against an adjacent tile. It therefore frequently results that the lateral forces cause tiles to pop out over the edge(s) of the adjacent tiles. It is for this reason that the provision of a strong adhesive layer bonding the carpet tiles to the floor has conventionally been seen to be so critical.

Attempts have been made to provide substitutes for the adhesive bonding of the carpet tiles to the floor. For example, U.S. Pat. No. 4,731,275 to Andersen describes a carpet tile assembly designed to resist lateral movement. The assembly includes a layer of elastomeric material vulcanized to the carpet layer, with a plurality of protrusions and spikes being provided thereon for mating with a base layer of material, such as a felt-like fiber mat. This assembly therefore requires that the base layer be secured to the floor, which would add dramatically to the cost of installation. Furthermore, while the Andersen patent purports to address the problems associated with the removal of adhesives from the floor, the method contemplates the use of adhesives as an option for securing the base layer to the floor.

U.S. Pat. No. 4,571,353 to Gable, Jr. describes interlocking carpet tiles. Each tile has shaped side edges so that the tiles can interlock with adjacent tiles to minimize movement of the tiles in relation to each other. The Gable patent discusses the fact that free-lay tiles have a tendency to buckle, curl and warp after use. The Gable tiles are described as also having a bottom layer of thermoplastic material, with the material having indentations or other designs on its bottom surface, in order to increase the coefficient of friction with the floor. As will be readily appreciated by those of ordinary skill in the art, this construction requires additional manufacturing expense and the construction would be much more difficult to install than conventional carpet tiles due to the interlocking nature of the individual tiles.

Similarly, U.S. Pat. Nos. 4,010,301 and 4,010,302 to Anderson et al. describe carpet tiles designed to have, among other things, improved floor hugging properties. To this end, the carpet tiles described in the '301 and '302 patents include a backing layer of thermoplastic material (e.g. natural or synthetic rubber, or thermoplastic material) having a series of friction-increasing indentations or corrugations. The backing layer is illustrated as being relatively thick, and is described as being applied in the form of a relatively stiff plastisol, leveled by a doctor blade, heated and embossed by an embossing roll to form indentations on the bottom surface.

As discussed in *Textiles for Residential and Commercial Interiors*, by Jan Yeager, (1986), pp. 334–335, the disclosure of which is incorporated herein by reference, attempts have been made to produce "free lay" carpet tiles of the rigid carpet tile variety. However, it was recognized that such installations could only be used where heavy rolling traffic would not be expected, as such would have a "snowplow" effect, raising the edges of the tiles. In an attempt to achieve a rigid free lay carpet tile, it was suggested to apply a heavy secondary backing (e.g. through the application of a heavy secondary backing such as alternate layers of heavy-gauge vinyl and glass fiber scrims) to provide increased dimensional stability. Even with this reinforcement, it was suggested that it would be desirable in many cases to glue down at least 10–20% of the carpet tiles in order to achieve satisfactory performance. Therefore, although prior products have categorized themselves as "free lay", such terminology is understood in the art to describe products having a reduced amount of adhesive securing them to the floor, such adhesive typically being applied in a grid pattern.

Since the introduction of carpet tiles, advances have been made in their construction, including the development of carpet tiles having cushion. Such tiles have been found to provide superior comfort to individuals walking on, standing on, or otherwise using the installations. Because the cushion tiles do not typically have the heavy rigid reinforcement of their rigid carpet tile counterparts, it would therefore be expected that the cushion backed tiles would require even more adhesive to obtain satisfactory securement to the floor, particularly where rolling traffic would be expected. For example, carpet tile manufacturers recommend that manufacturers use at least a grid of adhesive material to secure hard-back tiles, while recommending the use of a full adhesive layer beneath cushion-backed tiles.

Commonly-assigned U.S. Pat. No. 4,522,857 describes a prior attempt to produce free-lay cushion backed carpet tiles. While representing an advance over the prior art, the carpet tiles described in that patent still required the use of a grid of adhesive to keep them in proper position during use, particularly when encountering rolling traffic.

SUMMARY OF THE INVENTION

The instant invention is directed to a cushion back on foam back carpet tile which can be installed without the use of significant amounts of adhesive material, and preferably with no adhesive securing it to the floor.

It has been discovered by the inventor that by manufacturing the cushion or foam backed tiles within specific physical parameters, an installation having good stability and capable of withstanding rolling traffic can be achieved using minimal to no adhesive. In particular, it has been found that by manufacturing cushion backed carpet tiles having particular low amounts of cup and curl, they can be used to form entire installations which retain their position on the floor without the need for adhesive. For purposes of this invention, the term "cup" describes the amount a carpet tile comes up off of the floor (cups up) while the term "curl" describes the amount a corner curls up from the floor.

The cup and curl of the carpet tiles of the present invention are desirably measured as follows:

The tile is placed in a conditioned room (i.e. at 60° F. and 20% relative humidity) for at least 4 hours. The tile is marked so that the machine direction during fabrication (typically marked with arrows on the rear of the tile) is indicated. The tile is then placed face up (i.e. pile surface up, cushion surface down) on a flat surface, with the machine direction directed forward. Starting with the closest corner on the right side, the tester measures the distance from the flat surface to the base of the corner. Preferably, this curl measurement is measured to the nearest $\frac{1}{32}^{nd}$ of an inch or less. The tile is then rotated 90°, and the process repeated for the next corner. This process is repeated until the curl has been measured for each corner.

The tile is then flipped over so that the pile surface is down on the flat surface. The distance of the base of each corner (the free end or face of the pile) from the flat surface is again measured to determine the degree of cup for each corner.

In accordance with a preferred embodiment of the present invention, the carpet tiles of the instant invention are manufactured according to strict manufacturing requirements such that no corner of any tile has a cup of greater than $\frac{3}{16}"$, and no corner has a curl of greater than $\frac{1}{16}"$. Even more preferably, such that no corner of any tile has a cup of greater than $\frac{2}{16}"$ or a curl of greater than $\frac{1}{32}"$. Most preferably, such that every corner has a cup of less than $\frac{2}{16}"$ and a curl of less than $\frac{1}{32}"$. In contrast, the current standards for the conventional glue-down cushion-backed product are that the corners have a cup of $\frac{7}{32}"$ or greater and a curl of $\frac{3}{32}"$ or greater.

The individual cushion backed carpet tiles made according to the specifications of the present invention described above can be used to provide floor covering installations having a plurality of carpet tiles, which can withstand a variety of types of traffic, including rolling traffic, without the need for adhesives. Within the installation, it is therefore desirable that none of the tiles has an average cup of greater than $\frac{3}{16}"$, an average curl of less than $\frac{1}{16}"$, no corner with a cup of greater than $\frac{3}{16}"$, and no corner has a curl of greater than $\frac{1}{16}"$. Even more preferably, no corner of any tile in the installation has a cup of greater than $\frac{2}{16}"$ or a curl of greater than $\frac{1}{32}"$.

The carpet tiles of the present invention can be of any desired dimension; however, the preferred shape is that of a square tile. Particularly preferred are tiles which are either 18"×18", 36"×36", 50 cm×50 cm, or 1 m×1 m. However, tiles having different dimensions and shapes can also be utilized within the scope of the instant invention.

The tiles can also be of any desired thickness. Tiles having a thickness of about 0.15" to 0.75" are preferred. More preferably the tiles have a thickness of about 0.20" to about 0.55". Particularly preferred are carpet tiles with a thickness of about 0.25" to 0.45". Even more specifically, the cushion backing on each of the tiles desirably has a thickness of about 4 mm to 8 mm. More preferably, the cushion backing has a thickness of about 0.10" to about 0.25". Most preferably the tile has a cushion backing with a thickness of about 0.20". The carpet or pile fabric of the carpet tiles can be of any type, including cut pile, loop pile, cut and loop pile, tufted, bonded, woven, nonwoven, or the like. As will be appreciated by those of ordinary skill in the art, the overall thickness of the carpet tile will vary according to the type of pile forming the upper surface of the carpet tile and the type of cushion or backing. The tiles can also be constructed in any conventional manner, provided the structural parameters described above can be achieved. U.S. Pat. Nos. 4,397,900; 4,522,857; 4,647,484; 4,871,603; 4,540,968; 5,545,276; 5,929,145; and 5,948,500 describe exemplary carpet tile constructions and production processes, and are hereby incorporated by reference herein.

It is an object of the present invention to provide a method of laying or installing no adhesive cushion or foam backed carpet tiles to a surface comprising the steps of:
  a) reversibly securing or temporarily attaching at least one indicator carpet tile to the floor or surface with a securing means or device;
  b) placing a second carpet tile on the surface wherein the second carpet tile and the indicator carpet tile abut;
  c) placing a third carpet tile on the surface wherein the third carpet tile abuts at least one indicator carpet tile and the second carpet tile;
  d) placing a subsequent carpet tile on the surface wherein the subsequent carpet tile abuts with at least one of the indicator carpet tiles, the second carpet tile and the third carpet tile;
  e) removing at least one of the securing devices, securing means, and the indicator carpet tile; and
  f) replacing the indicator carpet tile or placing a carpet tile in the location vacated by the indicator carpet tile.

In accordance with alternative embodiments of the present invention, the securing device or securing means are one or more of double sticky tape, venerable adhesive peel and stick, or the like.

It is an object of the present invention to provide a method of laying or installing low adhesive cushion or foam backed carpet tiles to a surface comprising the steps of:
  a) reversibly securing or temporarily attaching at least one indicator carpet tile to the floor or surface with a securing means or device;
  b) placing a low adhesive carpet tile on the surface wherein the second carpet tile and the indicator carpet tile abut;
  c) placing a second low adhesive carpet tile on the surface wherein the third carpet tile abuts at least one indicator carpet tile and the second carpet tile;
  d) placing one or more subsequent low adhesive carpet tiles on the surface wherein at least one of the subsequent carpet tiles abut with at least one of the indicator carpet tiles, the second carpet tile and the third carpet tile;
  e) removing at least one of the securing devices, securing means, and the indicator carpet tile; and
  f) replacing the indicator carpet tile or placing a low adhesive carpet tile in the location vacated by the indicator carpet tile.

A particular feature of one embodiment of the present invention is the ability to form a water permeable floor covering system with a multiplicity of cushion backed carpet tiles wherein each of the multiplicity of cushion backed carpet tiles comprises:
  an upper textile surface with yarn protruding from a topside thereof;
  a polyurethane cushion or foam attached to a bottom side of the upper textile surface; and
  felt attached to the polyurethane cushion opposite to the upper textile surface, wherein the cushion backed carpet tile comprises a plurality of corners and each of the corners have a cup and about $\frac{3}{16}"$ or less and curl of about $\frac{1}{16}"$ or less.

Another particular feature of one embodiment of the present invention is the ability to form a floor covering comprising an element under the floor covering which is easily accessible. The element may include a sensor, an access hatch, a safe, a track for wiring or plumbing, a drain and other devices, items, or elements as described herein.

Furthermore, the tiles can be rearranged during the life of the floor covering to achieve differing visual effects without replacement of the tiles themselves

BRIEF DESCRIPTION OF DRAWINGS

FIG. 1A is a cut-away view of a carpet tile with a loop pile tufted carpet and a cushioned composite structure.

FIG. 1B is a cut-away side view of a carpet tile with a bonded carpet incorporating a cushioned composite structure.

FIG. 1C is a cut-away view of a carpet tile with a cut pile tufted carpet and a cushioned composite structure.

FIG. 1D is a cut-away side view of a carpet tile with a woven carpet incorporating a cushioned composite structure.

FIG. 1E is a cut-away view of a carpet tile with a non-woven carpet and a cushioned composite structure.

FIG. 2 is a schematic view illustrating an exemplary embodiment of the apparatus and process of the present invention.

FIG. 2A is a schematic view illustrating a modified embodiment of the apparatus and process of FIG. 2 with the latex back coat added during the process.

FIG. 3A is a cut-away side view of a carpet tile with a tufted carpet incorporating a structure formed by the apparatus and process of the present invention as illustrated in FIG. 2 or FIG. 2A.

FIG. 3B is a cut-away side view of a carpet tile with a bonded carpet incorporating a structure formed by the apparatus and process of the present invention as illustrated in FIG. 2.

FIG. 4A is a cut-away side view of an alternative embodiment of a carpet tile with a tufted carpet having no reinforcement layer.

FIG. 4B is a cut-away side view of an alternative embodiment of a carpet tile with a bonded carpet having no reinforcement layer.

FIG. 5 is a schematic view illustrating an alternative apparatus and process according to the present invention for forming a cushioned carpet composite without separate adhesive bonding between the primary carpet and the reinforcement layer.

FIG. 5A is a schematic view representing a modified embodiment of the apparatus and process of FIG. 5 without the addition of a reinforcement layer.

FIG. 6A is a cut-away side view of an alternative structure for a carpet tile with a tufted carpet formed by the apparatus and process illustrated in FIG. 5.

FIG. 6B is a cut-away side view of an alternative structure for a carpet tile with a bonded carpet formed by the apparatus and process illustrated in FIG. 5.

FIG. 7 is a schematic view illustrating yet another alternative apparatus and process according to the present invention for forming a cushioned carpet composite without separate adhesive bonding between the primary carpet and the reinforcement layer as illustrated in FIGS. 6A and 6B.

FIGS. 8A and 8B are respective simple and more complex schematic flow diagrams of the production of low weight modular carpet tiles in accordance with selected embodiments of the present invention.

FIG. 9 is a tabular representation of the materials, dimensions, temperatures, and the like used in the process of FIGS. 8A and 8B.

FIGS. 10–18 are schematic construction or layer diagrams of respective tufted and bonded low weight carpet tile, composite, or tiles in accordance with different embodiments or aspects of the present invention. It is to be understood that although the respective layers or materials incorporated in the low weight carpet, composite or tiles are shown separated in FIGS. 10–18, when construction is complete, the article has an integral layered appearance similar to that shown, for example, in FIGS. 3–4 or 6 of the drawings.

Although FIGS. 10A and 11–18 show a looped pile in the primary carpet and FIG. 10B shows a bonded primary carpet, it is to be understood that a tufted or bonded looped and/or cut pile may be used and that the pile may be sculptured, printed, dyed, and/or the like as desired.

FIG. 19 is a schematic view representing still another alternative apparatus and process of the present invention without felt.

FIG. 19A is a schematic view illustrating still yet another alternative embodiment of the apparatus and process of the present invention without felt (secondary backing) or scrim (reinforcement layer).

FIG. 20 is a diagrammatic representation of a preferred method for installing cushion backed carpet tiles of the present invention.

FIGS. 21a and 21B are illustrative views of a preferred method for installing a cushion backed carpet tile of the present invention.

FIG. 21c is a top view of an apparatus for use in the installation method illustrated in FIGS. 21a and 21b.

FIG. 22 is a top view of an embodiment of the present invention wherein carpet tiles are used to cover elements under the carpet tile.

FIG. 23 is a top view of another embodiment wherein carpet tiles are used to cover elements under the carpet tile.

DETAILED DESCRIPTION OF THE INVENTION

In the following detailed description of the invention, specific preferred embodiments of the invention are described to enable a full and complete understanding of the invention. It will be recognized that it is not intended to limit the invention to the particular preferred embodiment described, and although specific terms are employed in describing the invention, such terms are used in a descriptive sense for the purpose of illustration and not for the purpose of limitation.

In accordance with the present invention, a flooring, carpet, floor covering, carpet composite, carpet tile or modular carpet tile system and method is provided which is aesthetically pleasing, exhibits performance characteristics that rate it for heavy commercial use, has resilience and under foot comfort, which may be dyed or printed, and which may be installed with minimal or no adhesive.

An example of a tufted carpet product or carpet tile is illustrated in FIG. 1A and an example of a bonded carpet product or carpet tile is illustrated in FIG. 1B.

In the tufted carpet product 10A of FIG. 1A, a primary carpet fabric 12 is embedded in an adhesive layer 16 in which is embedded a layer of glass scrim 18 or nonwoven material. A foam base composite 19 is likewise adhesively bonded to the adhesive layer 16. In the tufted carpet illustrated in FIG. 1A, the primary carpet fabric 12 includes a loop pile layer 20 tufted through a primary backing 22 by a conventional tufting process and held in place by a pre-coat backing layer of latex 24 or other appropriate adhesives including a hot melt adhesive or the like. The foam base composite 19 of the tufted carpet product or carpet tile 10A includes an intermediate layer 26 molded to a layer of urethane foam 28 as illustrated.

The bonded carpet product or carpet tile 10B (FIG. 1B) employs the same type of foam base composite 19 adhesively bonded by adhesive laminate layers 16. However, the primary bonded carpet fabric 12 of product 10B has somewhat different components from that of the tufted carpet fabric 12 of product 10A in that it has cut pile yarns 34 implanted in a PVC, latex, or hot melt adhesive 36 having a woven or nonwoven reinforcement or substrate layer 38 of fiberglass, nylon, polypropylene or-polyester.

The carpet fabric of pile fabric 12 may be cut pile, loop pile, cut and loop pile, tufted, bonded, woven, non-woven, or the like. Although it is preferred that the carpet or pile fabric be a tufted or bonded, cut or loop pile carpet fabric or textile, it is contemplated that other woven or non-woven materials having a pile or nap may may be used. For example, FIG. 1C shows a cut pile tufted product 110C, FIG. 1D shows a woven product 210D, and FIG. 1E shows a non-woven product 110E.

A schematic view illustrating an exemplary apparatus and process used in forming the cushioned flooring, floor covering, carpet or tile of the present invention is illustrated in FIG. 2. The apparatus is designated generally by reference numeral 100. As illustrated, a primary carpet fabric 112 which may incorporate either a tufted or a bonded configuration (with loop or cut pile) as described above is drawn from a mounted carpet roll 114. As indicated previously, the primary carpet fabric 112 preferably includes a plurality of pile-forming yarns projecting outwardly from one side of a primary base. If the primary carpet 112 used in the present invention is a tufted carpet, its configuration will preferably conform to that of the primary carpet 12 illustrated in regard to that in FIG. 1A, while if the primary carpet 112 used in the present invention is a bonded product, its configuration will be that of the primary carpet 12 illustrated in FIG. 1B. It is contemplated that the primary carpet may include one or more backing base layers.

Alternative embodiments, including those disclosed in U.S. Pat. No. 4,576,665 to Machell (incorporated by reference herein), may likewise be utilized. For example, it is contemplated that specialized primary backings such as nonwoven structures comprising fiberglass sandwiched between layers of polyester may be utilized in the primary tufted carpet to impart the desired properties relating to stability thereby potentially reducing or even eliminating the need for the latex pre-coat presently utilized. Moreover, it is contemplated that if a pre-coat is to be utilized, it may be added directly in-line in an operation prior to any adhesive operation.

It is to be understood that, as with the prior art products, wherein the primary tufted or bonded carpet fabric 12 may have different embodiments, the component structure of the primary carpet fabric is not critical to the present invention. Rather it is intended that any primary carpet fabric having a pile forming portion may be utilized as the primary carpet fabric. The primary carpet may also include a "primary base" such as any single layer or composite structure including, inter alia, the commonly used layered composite of primary backing 22 and latex pre-coat 24 previously described in relation to the tufted product (FIG. 1A) and the adhesive layer 36 with reinforcement substrate 38 previously described in relation to the bonded product (FIG. 1B). As will be appreciated, the use of polyester in the primary base structure may be desirable due to the eventual heat curing such structure may undergo. Other embodiments as may occur to those of skill in the art may, of course, also be utilized. For example, in the bonded product, the pile forming yarns could be heat tacked to the substrate 38 as described in U.S. Pat. No. 5,443,881 (hereby incorporated by reference herein) to permit simplified construction of a primary carpet.

Alternative embodiments including those disclosed in U.S. Pat. No. 4,576,665 to Machell (herein incorporated by reference) may likewise be utilized. For example, it is contemplated that specialized primary backings such as non-woven structures comprising fiberglass sandwiched between layers of polyester may be utilized in the primary tufted carpet to impart the desired properties relating to stability thereby potentially reducing or even eliminating the need for the secondary backing or the latex pre-coat presently utilized. Moreover, it is contemplated that if a pre-coat is to be utilized, it may be added directly in-line in an operation prior to any adhesive operation.

With regard to one embodiment, in the tufted carpet product 110A of the present invention (FIG. 3A), the primary carpet fabric 112 preferably comprises a loop pile layer 120 of pile-forming yarns tufted into a primary backing 122 as is well known and held in place by a pre-coat of latex or a hot melt adhesive 124. It is contemplated that the latex or hot melt adhesive may be added in-line after removal from the carpet roll prior to the application of any other adhesive as described below. The carpet may be steamed after addition of the pre-coat to facilitate subsequent printing operations if desired to reduce stresses. The two basic primary backing constructions are woven polypropylene and non-woven polyester. Each material may have a variety of construction characteristics engineered for a specific end use. The preferred primary backing material is 20 pick per inch, woven polypropylene, with needle punched nylon fleece.

In accordance with one example of the present invention and with reference to FIG. 2A of the drawings, the primary carpet 112 is a loop pile tufted carpet formed by tufting, for example, a non-heat set yarn through the primary backing, then washing, steaming, drying, and injection or jet dying thereon are, preferably, monolithic or orientation independent design, color, or pattern to form, for example, a 12 foot wide primary carpet precursor of loop pile 120 and primary backing 122. By using a non-heatset yarn, and originally tufting the yarn at a rather long loop length, the washing, steaming, drying, and dying steps shrink the yarn to form smaller, tighter loops and provide a denser surface to the primary carpet precursor. Next, this primary carpet precursor is split in half and rolled to form, two separate six foot wide rolls 115 of split primary carpet precursor 113 (FIG. 2A). Next, one roll 115 of the split primary carpet precursor 113 is used as the initial carpet feed in and the apparatus of FIG. 2A. The latex pre-coat or hot melt adhesive coat 124 is added to the back of the primary carpet precursor 113 to form a primary carpet fabric 112 in the upper run of the apparatus of FIG. 2A downstream of the accumulator 150 and upstream of the reinforcement bonding unit 155. For example, a thin layer of latex pre-coat 119 is applied to the back of the primary carpet precursor 113 using a coating roller 117.

In accordance with one embodiment of the present invention, the primary carpet precursor (not having a latex pre-coat) is rolled or wound with the primary backing 122 exposed (FIGS. 19 and 19A).

Also, it is contemplated that the apparatus of the present invention may include the entire assembly process from tufting the yarn in the primary backing, dying the tufted yarn, latex pre-coating the back of the primary backing, hot-melt coating the fiberglass reinforcing material, foam-coating the felt secondary backing, laminating the primary carpet, reinforcing fiberglass, and foam cushioning layer, heating or curing the laminate, and cutting the resultant carpet composite into carpet tiles, runners, area rugs, or the like. Also, it is contemplated that in accordance with the present invention the process may be broken down into its respective steps and done in a batch or preformed rather than a continuous mode, although the continuous mode of operation is preferred. For example, the primary carpet may be formed in one operation and placed on rolls. The cushion backing or foam layer may be formed in a separate operation and placed on a roll. The two preformed rolled materials may be joined by a mating unit using an adhesive, hot melt, hot melt with reinforcing layer, or the like.

With regard to one embodiment, in the tufted carpet product 110A of the present invention (FIG. 3A), the primary carpet fabric 112 preferably comprises a loop pile layer 120 of pile-forming yarns tufted into a primary backing 122 as is well known and held in place by a pre-coat of latex or hot melt adhesive 124. It is contemplated that the latex or hot melt adhesive may be added in-line after removal from the carpet roll prior to the application of any other adhesive as described below. The carpet may be steamed after addition of the pre-coat to facilitate subsequent printing operations if desired to reduce stresses.

In the bonded carpet product 110B of the present invention (FIG. 3B), the primary carpet fabric 112 preferably comprises a plurality of cut pile yarns 134 implanted in a latex or hot melt adhesive 136 which is laminated to a reinforcement or substrate layer 138 of a woven or non-woven material including fiberglass, nylon, polyester or polypropylene. It is contemplated that this substrate layer 138 may be pre-coated with latex or other thermoplastic polymers to permit melting adhesion with the cut pile yarns 134 upon the application of heat, thereby potentially reducing or eliminating the need for the latex or hot melt adhesive 136.

The yarns 120, 134 may be either spun or filament yarns and are preferably formed from a polyamide polymer such as nylon 6 staple, nylon 6 filament, or nylon 6,6 staple, nylon 6,6 filament, available from DuPont Fibers in Wilmington, Del., although other suitable natural or synthetic yarns may likewise be employed as will be recognized by those of skill in the art. By way of example only and not limitation, other materials, which might be used, include polyester staple or filament such as polyethylene terephthalate (PET), and polybutylene terephthalate (PBT); polyolefins, such as polyethylene and polypropylene staple or filament; rayon; and polyvinyl polymers such as polyacrylonitrile. A variety of deniers, plies, twist levels, air entanglement, and heatset characteristics can be used to construct the yarn. The preferred material is nylon 6,6, filament, 1360 denier, 1 ply, no twist, no entanglement, and no heat set.

The face weight of the carpet, or weight of yarn per area, is preferably from about 10–60 ounces per square yard. More preferably, the face weight of the carpet is at least about 12 ounces per square yard to about 50 ounces per square yard. In a preferred low weight embodiment, the face weight is at least about 12 ounces per square yard to about 20 ounces per square yard and more preferably about 12 to about 15 ounces per square yard. In an alternate preferred embodiment the face weight is about 15 to about 50 ounces per square yard and more preferably about 20 to about 40 ounces per square yard.

In the tufted product, the adhesive pre-coat 124 is preferably styrene butadiene rubber (SBR) latex but other suitable materials such as polyvinyl chloride (PVC), ethylene vinyl acetate (EVA), acrylic, and hot melt adhesives, as are well known to those of skill in the art, may likewise be utilized. In the event that a hot melt adhesive is utilized, it is contemplated that a reinforcement material such as a glass scrim could be directly attached to form a composite laminate without the use of adhesives. Moreover, as previously indicated, it is contemplated that the adhesive pre-coat 124 may be entirely eliminated in the tufted product if the loop pile 120 is tufted in suitably stable relation to the primary backing 122. The commonly used hot melts are bitumen, polyolefin-based thermoplastic, and polyurethane. The preferred hot melt material is polyolefin based thermoplastic.

Referring again to FIG. 2, in the potentially preferred practice the primary carpet fabric 112 is conveyed by means of a plurality of rolls through an accumulator 150 as is well known in the art to a reinforcement bonding unit 155. Simultaneously with the conveyance of the primary carpet fabric 112 to the reinforcement bonding unit 155, a sheet of reinforcement material 158 is likewise conveyed to the reinforcement bonding unit 155. The reinforcement material 158 is preferably fiberglass non-woven material such as a 2.0 oz/yd$^2$ fiberglass containing a urea formaldehyde binder although alternative materials may include woven glass, woven polyester, non-woven glass, and non-woven polyester.

At the reinforcement bonding unit 155, an adhesive 160 (FIGS. 3A, 3B) such as a hot melt adhesive is preferably applied to the reinforcement material 158 by means of a film coater or other such unit as are well known. The reinforcement material 158 and the primary carpet fabric 112 are thereafter preferably passed in mating relation between joining members such as rolls 163, 165, thereby bonding the reinforcement material 158 to the underside of the primary carpet fabric 112. That is, the reinforcement material 158 is bonded on the side of the primary carpet fabric 112 from which the pile forming yarns do not project. The bonding of the reinforcement material 158 to the underside of the primary carpet fabric produces a preliminary composite 166 which is thereafter laid into a puddle of a polyurethane-forming composition as described below.

Although the reinforcement bonding unit 155 is illustrated in its preferred embodiment as incorporating a film coater, it is to be understood that alternative equivalent means such as application rolls, spray headers and the like may also be utilized. By way of example only, and not limitation alternative means for the application of adhesive 160 are disclosed in U.S. Pat. No. 4,576,665 to Machell.

In the preferred practice, while the preliminary composite 166 is being formed, a backing material 170 such as a non-woven backing is passed through a scray 172 to a polymer application unit 175 which preferably includes a polymer discharge unit 176 and a doctor blade 177. The backing material 170 is coated with a polymer 178 such as a polyurethane-forming composition as disclosed more fully below.

In the preferred embodiment, the backing material 170 is woven or non-woven 10% to 100% polyester and 90% or less polypropylene. More preferably the backing material is 40–80% polyester and 20–60% polypropylene. In a particularly preferred embodiment the backing is about 50% polyester and about 50% polypropylene non-woven fibrous material or felt which is available from Spartan Mills Company in Spartanburg, S.C. While this represents the backing material of preference, it is to be understood that any number of alternative compositions may likewise be utilized as dictated by requirements regarding shrinkage and installation. The commonly used secondary backing materials include non-woven polyester, non-woven polyester and polypropylene blends, or woven polypropylene. By way of example only, in instances where very little or no shrinkage may be tolerated, the backing material may be up to 100% polyester. Further, while a non-woven backing material may be preferred, it is contemplated that either woven or non-woven constructions may be utilized as can materials other than the polyester/polypropylene mix such as nylon, fiberglass and the like. The weight and thickness of the backing material 170 can vary, for example, in the range of from about 2–4 oz/yd$^2$ non-woven or from about 0.01 inches to about 0.19 inches, although a range of between about 0.05 inches and 0.12 inches may be preferred.

As indicated, in the preferred practice the polymer application unit 175 applies a deposit of a polymer 178 (FIGS. 3A, 3B) to the backing material 170 after which the height of the polymer is doctored to a desired level.

In the preferred practice, the polymer applied is a polyurethane-forming composition based on a so-called soft segment pre-polymer of MDI (diphenylmethane diisocyanate) or an MDI derivative. The polyurethane-forming composition also preferably incorporates a silicone surfactant to improve both the frothability and stability of the polyurethane layer or "puddle" which is spread across the surface of the backing material 170. The preferred foam density is about 5–30 lbs/ft$^3$. More preferred is a foam density of about 15 lbs. per cubic foot to about 20 pounds per cubic foot. It is preferable that the backing material be at least about 0.06 inches thick and more preferably at least 0.10 inches thick. A foam backing with a foam density of about 18 lbs. per cubic foot and a thickness of greater than 0.10 inches has been proven to be exemplary. A foam backing with a foam density of about 16 lbs. per cubic foot or less with a thickness of about 0.06 inches has also been determined to be exemplary. When the backing material 170 is not employed, it is particularly preferred that the polymer be an open cell foam.

The preferred polyurethane-forming composition for use in the present invention is disclosed in U.S. Pat. No. 5,104,693 to Jenkines the teachings of which are incorporated herein by reference. Specifically, the preferred polyurethane-forming composition, which is applied across the surface of the carrier backing 170, includes:

A. At least one isocyanate-reactive material having an average equivalent weight of about 1000 to about 5000;

B. An effective amount of blowing agent; and

C. A polyisocyanate in an amount to provide an isocyanate index of between about 90 and about 130, wherein at least 30 percent by weight of such polyisocyanate is a soft segment pre-polymer reaction product of a stoichiometric excess of diphenylmethane diisocyanate (MDI) or a derivative thereof and an isocyanate-reactive organic polymer having an equivalent weight of from about 500 to about 5,000 and wherein the pre-polymer has an NCO content of about 10 to about 30 percent by weight.

The polyurethane-forming composition also preferably contains a silicone surfactant to improve frothability and stability in the form of an Organo-silicone polymer such as are disclosed generally in U.S. Pat. No. 4,022,941 to Prokai et al. the teachings of which are incorporated herein by reference. Specifically, the preferred surfactant is preferably a linear siloxane-polyoxyalkylene (AB) block copolymer and specifically a polyalkyleneoxidemethylsiloxane copolymer. One such silicone surfactant, which is particularly useful, is available under the trade designation L-5614 from OSI Specialties, Inc. whose business address is believed to be 6525 Corners Parkway, Suite 311, Norcross, Ga. 30092.

A sufficient level of the silicone surfactant is used to stabilize the cells of the foaming reaction mixture until curing occurs to allow the preliminary composite 166 to be laid into the uncured polyurethane-forming composition puddle without destabilizing the layer of such polyurethane-forming composition disposed across the surface of the backing material 170. In general, the silicone surfactants are preferably used in amounts ranging from about 0.01 to about 2 parts per hundred parts by weight of component (A) and more preferably from about 0.35 parts to about 1.0 parts by weight of component (A) and most preferably from about 0.4 to 0.75 parts per hundred parts by weight of component (A).

As previously indicated, after disposition of the polymer across the backing material 170 the layer or "puddle" of polymer deposited is preferably doctored to a pre-determined height by means of a doctor blade located at the polymer application unit 175. While a simple mechanical doctor blade is preferred, alternative equivalent means such as an air knife or the like may also be used. Such an air knife is disclosed, for example, in U.S. Pat. No. 4,512,831 to Tillotson (incorporated by reference).

In one embodiment of the present invention the primary carpet fabric 112, which is preferably joined to reinforcement material 158 to form the preliminary composite 166, can be laid directly into the polyurethane-forming composition immediately after it is doctored to the appropriate level without any need to significantly heat either the preliminary composite 166 or the polyurethane-forming composition. Accordingly, the preliminary composite 166 and the backing material 170 with the applied polyurethane-forming composite may be simultaneously delivered at room temperature to a mating roll 180 immediately following the application and doctoring of the polyurethane-forming composition. As will be appreciated, this avoidance of lag time between formation of the components of the cushioned carpet composite permits highly efficient processing readily controllable either manually or by computer control means (not shown) as are well known to those of skill in the art. In the preferred process, the preliminary composite 166 may be slightly preheated to improve operating control during lamination and curing but such preheat is not essential to formation of the desired product.

In the illustrated and preferred embodiment of the carpet, the process described above results in the layer of reinforcement material 158 being laid adjacent to and at least partially embedded in the layer of polyurethane 178. That is, the reinforcement material 158 is preferably in intimate contact with the polyurethane 178 such that the polymer material will hold the reinforcement in place.

Once the preliminary composite 166 has been laid into the polyurethane-forming composition, the resulting composite may be heated in a heating unit 182 by means of conduction, radiant, or convection heaters as are well known in the art. Contact conduction heaters may be preferred. Such heating may be carried out at a temperature of between about 250° F. and about 325° F. for between about 2 minutes and 8 minutes. The resulting foam cushion layer (FIGS. 3A, 3B) which is produced thereby has a density of between about 12 pounds per cubic foot and about 20 pounds per cubit foot preferably between about 14 pounds per cubic foot and about 16 pounds per cubic foot, and more preferably about 16 pounds per cubic foot.

Following the heat curing operation, the cushioned carpet composite which is formed may be passed over a unidirectional heat source 185 such as a plate heater or roll heater at about 400° F. to fuse any outstanding fibers on the backing material 170 into a smooth surface. The carpet composite, which is formed, will thereafter be cut into carpet tiles almost immediately (rather than rolled) to avoid any undesired cupping or curl. After the carpet tiles are cut from the composite, they are stacked, packaged and shipped to the customer or store.

It will be appreciated that a number of alternative practices may be incorporated into the present invention yielding slightly different products. By way of example only, the reinforcement material 158 may be left completely out of the process thereby making the use of the adhesive application apparatus 155 and adhesive 160 completely unnecessary. In such instances, the primary carpet fabric may be laid directly into the polyurethane-forming composition thereby yielding a composite structure as illustrated in FIGS. 4A and 4B with the polyurethane 278 immediately adjacent to the primary carpet fabric 212. In FIG. 4A the primary carpet fabric 212 comprises a yarn tufted with a primary backing 222 and secured with a latex pre-coat 224. A backing 270 is adhered to the polyurethane. In FIG. 4B the primary carpet fabric 212 is a bonded carpet with a yarn 234 bonded to a latex or hot melt adhesion layer 236. A substrate layer 238 of woven or non-woven material including fiberglass, nylon, polyester or polypropylene acts as a reinforcement. The polymer layer 278 and backing layer 270 are as previously described and other embodiments are described in reference to FIGS. 17 and 19A.

In accordance with another embodiment, when the cushion layer is preformed rather than formed in-situ, a hot melt layer may be used to mate the primary carpet to the cushion layer with or without the reinforcement material as illustrated in FIG. 12.

It is contemplated that in some instances the backing 170, 270 might be completely eliminated such that the polyurethane cushion 178, 278 would directly contact the flooring as disclosed in relation to U.S. Pat. No. 4,286,003 which is incorporated herein by reference.

In a particularly preferred embodiment without the lower backing layer (170, 270), the polyurethane coating or layer (178, 278) acts as a non-skid surface. In this instance the polyurethane coating is a low adhesive layer since the carpet tile is precluded from sliding laterally but not from being lifted off of the surface. Adhesion is determined by the coefficient of friction as measured by determining the force required to initiate lateral movement on a slide using a material that represents an installation surface. For the purposes of the present invention the term low adhesion is used to define a carpet of tile or product dimensions which requires a stronger force to slide on a surface than to lift the tile (peel strength).

In one embodiment, the surface to have the carpet tile laid thereon is treated with a friction enhancement treatment or compound. The friction enhancement treatment or compound causes the carpet tile and surface to have an enhanced coefficient of friction.

In a particularly preferred embodiment, the carpet tile has a peel strength which is less than the sliding force.

Although it is preferred for the tufted modular carpet tile of the present invention to have the following layers: yarn, primary backing, latex pre-coat adhesive, hot melt adhesive, fiberglass, polyurethane foam, and felt (FIG. 10A), it is contemplated that one or more of these layers may be eliminated or substituted for and still provide a carpet tile having the desired properties or characteristics. For example, the latex pre-coat adhesive layer may be replaced by a bitumen hot melt layer (FIG. 11), the felt layer may be eliminated (FIGS. 16 and 17), the glass layer may be eliminated (FIG. 12), or the like.

An alternative process and apparatus for producing a cushioned carpet composite according to the present invention is shown schematically in FIG. 5. As illustrated, a primary carpet fabric 312 having either a tufted or a bonded configuration is drawn from a mounted carpet roll 314, through an accumulator 350, in the same manner described above. Simultaneously with the delivery of the primary carpet fabric 312 to the mating roll 380, a reinforcement material 358 such as a non-woven glass is delivered to a polymer contact roll 360 or similar device such as an extrusion coater. The polymer contact roll 360 preferably is in rolling contact with both the surface of the reinforcement material 358 as well as with an accumulation of a polymer 378 such as the polyurethane-forming composition previously described. The polymer contact roll 360 serves to pick up a portion of the polymer 378 and to pass the polymer over and through the reinforcement material 358.

Simultaneously with the passage of polymer through the reinforcement material 358, a backing material 370 such as the non-woven polyester/polypropylene described above is preferably passed in adjacent mating relation to the polymer-coated reinforcement material 358 between the polymer contact roll 360 and a backing material mating roll 379. A doctor blade 377 serves to control the depth of the polymer which does not pass through the reinforcement material 358 into contact with the backing material 370. Thus, it is to be appreciated that a polymer sandwich structure is formed preferably comprising a layer of backing material 370, a relatively thin layer of polymer 378 such as polyurethane which has been passed through a layer of reinforcement material 358, and a doctored layer of polyurethane 378 which was not passed through the reinforcement material 358. This polymer sandwich structure can thereafter be passed to the mating roll 380 for joinder with the primary carpet fabric 312 by laying the primary carpet fabric 312 directly into the doctored layer of polyurethane 378 without any pre-curing operation.

A potentially preferred configuration for a resulting tufted carpet composite is illustrated in FIG. 6A. As illustrated, the reinforcement material 358 will be at least partially surrounded by, and embedded in, the polyurethane 378. As illustrated, it is contemplated that the layer of pre-coat may be eliminated in the tufted structure since the tufts may be held in place by the polyurethane 378. A potentially preferred configuration for a resulting bonded carpet composite is shown in FIG. 6B.

With respect to FIGS. 4A, 4B, 5A, 12 and 17 of the drawings, the scrim and hot melt layers can be eliminated simply by not feeding the scrim 358 along with the felt 370 and primary carpet 312.

Another alternative process and apparatus for joining all layers of the cushioned carpet composite is illustrated in FIG. 7. As shown, a layer of reinforcement material 358 is preferably passed adjacent to a polymer contact roll 360 which is in simultaneous rolling contact with both the reinforcement material 358 and a deposit of polymer 378. The polymer contact roll 360 serves to spread a portion of the polymer 378 through the reinforcement material 358 to create a coating on both sides thereof. The reinforcement material 358 with its coating of polymer 378 is then joined in a laminate structure to the primary carpet fabric 312 and a layer of backing material 370 by passage through the nip between the doctor blade 377 and backing material mating roll 379. This practice will yield a bonded carpet composite structure substantially similar to those which are illustrated in FIGS. 6A and 6B.

In accordance with one aspect of the present invention, the designs that are printed on the low weight modular carpet or carpet tile are characterized as orientation independent, omnidirectional, or as having the ability to seam properly without cutting the tiles in register with the design. The techniques used to create these designs make it possible to install modular carpet monolithically rather than quarter turn or ashler. The commonly used techniques of modular carpet installation such as quarter turn (parquet), monolithic, and ashier (brick) may be used to install carpet product or carpet tiles of the present invention. The preferred technique is either monolithic or ashier.

With reference to FIGS. 12, 18, and 19 of the drawings, the felt and hot melt layers can be eliminated by, for example, feeding the primary carpet 312 through an apparatus similar to that shown in FIG. 5 of the drawings, except that the carpet is inverted and the polymer layers applied directly to the scrim and surface of the primary carpet.

With respect to FIGS. 17 and 19A of the drawings, the glass or scrim is eliminated by not feeding the scrim along with the carpet and polymer.

In one exemplary embodiment of the present invention a modular carpet tile includes a textile surface comprising a yarn with a face weight of about 10–60 oz/yd$^2$. More preferably, the face weight of the carpet is at least about 12 ounces per square yard to about 40 ounces per square yard. In a preferred embodiment the face weight is at least about 12 ounces per square yard to about 20 ounces per square yard and more preferably about 12 to about 15 ounces per square yard. In an alternate preferred embodiment the face weight is about 15 to about 50 ounces per square yard and more preferably about 20 to about 40 ounces per square yard.

In accordance with an exemplary embodiment of the present invention, a low weight modular carpet composite which may be cut to form low weight modular carpet tiles includes a low weight primary carpet or greige carpet having, for example, a face weight of less than or equal to about 15 oz/yd$^2$, a hot melt layer of less than or equal to about 50 oz/yd$^2$, and a lightweight cushion of about 0.04–0.12 inches thick. The cushion may have a density of about 13–16 lbs. per cubic foot or less.

The instant invention is primarily directed to a cushion backed carpet tile which can be installed and retained in position without the use of significant amounts of adhesive material, and preferably with no adhesive securing it to the floor. For purposes of this application, the tiles have been described as being secured to a floor or surface; this is intended to encompass any surface to which the carpet tiles are laid including, but not limited to, surfaces that are to be walked upon, sat upon, ridden on, or the like.

It has been discovered by the inventor that by manufacturing the cushion backed tiles within the specified physical parameters, an installation having good stability and capable of withstanding rolling traffic can be achieved using minimal to no adhesive. In particular, it has been found that by manufacturing cushion backed carpet tiles having the specified amounts of cup and curl, they can be used to form entire installations which retain their position on the floor with little to no adhesive.

The phenomenon enabling the unique performance of the carpet tiles of the invention is not readily understood by the inventors, since it would appear that the lateral forces experienced by a cushion backed carpet tile in response to a rolling force would be greater than those experienced with a regular rigid back-type carpet tile, thereby suggesting that the cushion product would provide a greater amount of adhesive to retain its proper position on the floor. It is believed that the compressibility of the carpet tiles in combination with their specific flatness parameters cooperate to distribute the load of traffic (e.g., rolling traffic) in a unique manner to positively effect the distribution of the lateral forces. As a result, the tiles do not tend to snowplow over each other in the manner of conventional carpet tiles when subjected to rolling traffic and the like.

The carpet tiles of the instant invention are manufactured according to strict manufacturing requirements such that no tile has an average cup of greater than $3/16"$, no tile has an average curl of greater than $1/16"$, no corner of any tile has a cup of greater than $3/16"$, and no corner has a curl of greater than $1/16"$. Even more preferably, no corner of any tile has a cup of greater than $2/16"$ or a curl of greater than $1/32"$.

The individual cushion backed carpet tiles made according to the specifications described above can be used to provide floor covering installations having a plurality of carpet tiles, with none of the plurality of tiles having a cup of greater than $3/16"$, and no corner having a curl of greater than $1/16"$. Even more preferably, no corner of any tile in the plurality forming the adhesive-free portion of the installation has a cup of greater than $2/16"$ or a curl of greater than $1/32"$.

The preferred composition of the carpet tiles of the present invention provides for improvements in physical attributes, as measured by the cup, curl, and dimensional stability which is not available in the art. Specifically, the felt backing layer and glass stabilizer layer provide a structural strength which allows the flatness of the carpet to be controlled at a level which allows the use of the carpet tiles without adhesives.

The carpet tiles of the invention can be of any desired dimension; however, the preferred shape is that of a square tile. Particularly preferred are tiles which are either 18"×18" or 36"×36". However, tiles having different dimensions such as 50 cm×50 cm or 1 m×1 m could also be utilized within the scope of the instant invention.

The tiles can also be of any thickness desired. Tiles having a thickness of about 10 mm–20 mm are preferred. More preferably the tiles have a thickness of about 0.20" to about 0.55". Even more specifically, the cushion backing on the tiles desirably has a thickness of about 4 mm–10 mm. More preferably the cushion backing has a thickness of 0.10" to about 0.25". In a particularly preferred embodiment the carpet tile has a compression of about half its original foam or cushion thickness under normal foot load of approximately 150 pounds.

The carpet tiles can be of any type and preferably include a textile surface with a foam layer functionally secured beneath the textile surface. For example, the foam layer may be secured directly to the textile surface, or may be secured by way of one or more intermediate layers. As noted above, the foam layer is desirably compressible so as to provide a level of cushioning when an individual travels across the textile surface such as walking across the floor covering. In a preferred form of the invention, the cushion layer is formed from a material having a density of about 8 lbs per cubic foot to about 22 pounds per cubic foot. In a particularly preferred form of the invention, the material has a density of about 16 pounds per cubic foot. The cushion can be formed from any material which provides the requisite performance properties; substantially open cell polyurethane has been found to perform particularly well in this application.

The textile surface can be of any variety desired, including but not limited to a woven, knit or non-woven fabric, a cut pile, loop pile, bonded, tufted surface, or the like. As will be appreciated by those of ordinary skill in the art, the overall thickness of the carpet tile will be varied according to the type of pile forming the upper surface of the carpet tile. The tiles can also be constructed in any conventional manner, provided the structural parameters described above can be achieved.

The installation of the tiles will desirably be performed as follows, although other methods can be utilized within the scope of the invention. In order to provide an equal number of tiles around the perimeter of the room, the installer will typically measure the room to determine the center point. A minimal number of tiles (generally two to four tiles) will desirably be aligned at the room center point, and temporarily secured into place by way of double stick tape. Since no adhesive is then required for the carpet tiles, the tiles can be pushed into place in a spiral-like manner about the center tiles, progressing outwardly until the entire flooring region to be covered is properly overlaid with tiles (FIG. 20). As will be appreciated by those of ordinary skill in the art, this enables tiles to be pushed into place as well as pulled into place. Therefore, an installer can position himself in the most efficient position for installing the tiles rather than being forced to sit on the already installed tiles as was the case with most adhesive installation methods. If desired, the double stick tape can then be removed from beneath the four centered tiles to provide an entirely adhesive-free installation.

A preferred method of installing carpet tiles of the present invention will be described by referring to FIG. 20. For the purposes of illustration each carpet tile in FIG. 20 is designated with letters to indicate a side relative to the room. It is to be understood that this is for illustration purposes only. In FIG. 20, the area to be carpeted 500 is measured and the approximate center determined. Indicator carpet tile 1 is placed in position such that one side has a preferred orientation with respect to at least one reference wall. In the embodiment illustrated, the preferred orientation is parallel to the walls and the walls form a rectangle. As an alternative, the carpet tiles may be at a bias to one or more walls in some circumstances (if desired or dictated by the design). The indicator carpet tile 1 is reversibly or temporarily secured by two sided tape or a light, removable adhesive which inhibits the carpet from moving laterally but which does not prohibit the carpet tile from being removed by lifting vertically. The manner in which the indicator carpet tile is reversibly secured is chosen to insure that the carpet can be removed at will after a certain number of carpet tiles are installed.

After indicator carpet tile 1 is in place, a second carpet tile 2 is placed with one edge of the second carpet tile abutting one edge of the indicator carpet tile and two edges of the second carpet tile being about co-linear with two edges of the indicator tile. In the embodiment illustrated, side "c" of the second carpet tile 2 and side "a" of the indicator carpet tile 1 abut. The second carpet tile can be temporarily secured if so desired and if a large area is being carpeted this may be desirable. A third carpet tile 3 is placed such that one edge of the third carpet tile 3 abuts one edge of a carpet tile previously laid and two edges of the third carpet tile are co-linear with two edges of a previously laid carpet tile. In the embodiment illustrated, the "d" edge of the third carpet tile 3 and the "b" edge of the second carpet tile 2 abut, however, there are six options all of which are within the scope of the present invention. Each subsequent carpet tile 4, 5, 6, etc. is laid in an analogous manner. It is most preferred that the order of carpet laying forms a spiral since this method has a high number of instances wherein a carpet tile being laid abuts two edges of previously laid carpet tiles. This is advantageous since each seam is tight and the final visual appearance is consistent and the finished floor appears to be covered by a broadloom carpet. After a sufficient number of carpet tiles are laid to insure that the indicator carpet tile will not move laterally, the indicator carpet tile is lifted and the manner in which the indicator carpet tile was temporarily secured is removed. Although the indicator tile or tiles may remain adhered to the floor, it is preferred to remove the temporary securing means to allow access under the indicator tile.

A particularly preferred method of installing carpet tiles of the present invention will be described in reference to FIGS. 21a, 21b and 21c. In FIGS. 21a–b, the carpet tile being installed 601 is supported, in part, by a carpet spatula 602. By supporting the majority of the carpet tile, the junction between edges 603 and 604 can be very carefully made to insure that there are no gaps or overlaps. One advantage of the non-slip inventive carpet product is the minimal transverse slippage once laid in place. When installing the carpet tiles this is a disadvantage since it is difficult to slide the carpet tile once it is laid close to the desired position and then slid into optimal position. Furthermore, the carpet spatula allows the air to be excluded from under the carpet tile as the carpet spatula is withdrawn. In use, the carpet tile to be installed is laid on the support plate 605 of the carpet spatula 602. The orientation of the carpet spatula is controlled by an optional, but preferred, handle 606. The handle allows one installer to stand upright which decreases fatigue associated with bending over. The carpet tile is then persuaded in the direction of the arrows to insure that the carpet abuts properly. The carpet spatula is then slowly withdrawn and the carpet tile lays in the proper position relative to the previously installed carpet tiles.

The carpet tiles may have any color, design, print or pattern without departing from the scope of the invention. In particular, the carpet tiles may have a monolithic pattern which has no preferred rotational orientation relative to the nearest neighbor carpet tiles. The carpet tiles may also have a pattern wherein each individual carpet tile has a portion of a larger pattern and therefore rotational and lateral placement of the carpet tile is critical relative to the nearest neighbors. Examples would include large patterns, designs, logos and the like wherein the logo is larger than a carpet tile. The carpet tiles may also comprise a brick pattern wherein each carpet tile has a portion of a design which is repeating with a repeat frequency. Typically, a carpet with a brick pattern has a rotational preference but no lateral preference with respect to nearest neighbor carpet tiles.

FIG. 22 is a top view of an embodiment of the present invention. In FIG. 22 a floor 650 is covered with a multiplicity of carpet tiles 651 which typically appear as a continuous carpet. The multiplicity of carpet tiles may also form distinct patterns with pattern sizes that are smaller than, the same size as, or larger than a distinct tile. For example, the multiplicity of carpet tiles may form a monolithic pattern thereby appearing to the naked eye no different than a single piece of broadloom carpet. Alternatively, the carpet tiles may each have a pattern distinguishing one tile from the next. Each tile may also provide one aspect of a larger pattern similar to a puzzle. In the embodiment illustrated in FIG. 22, the carpet tiles cover an element 652, which is optionally embedded in an indentation 653 in the floor 650. The element 652 includes electrical connections, as would be used for connections to alternating current supply, direct current supply or computer communication ports. Element 652 is a sensor or sensors, such as moisture, pressure, temperature, time, audible, or optical sensors. The element sensor 652 is useful for detecting moisture under the carpet, traffic over the carpet, deterioration of the carpet, conversations above the carpet, or may be used with certain frequencies of radiation to monitor activities above the carpet tile. At least one access carpet tile 654 covers the sensor 652 to obscure it from detection yet does not inhibit access. A channel 655 in the floor, 650, can be used for connections to the element 652 by connector 656 which include wires, fiber optics and/or other connections to elements known in the art. An optional access hole 656 in the access carpet tile 654 allows passage of electrical wires, or the like, when needed. The access carpet tile 654 may be replaced by a carpet tile which does not have an access hole. This allows an area to be modified for different environments. For example, an access carpet tile with an access hole may be incorporated when electrical connections are required and replaced when they are not required. The same area could be used for displays in one instance or as a ballroom in another instance. The use as a ballroom would not require unsightly electrical connections to be visible. With the carpet tiles of the present invention, a large area can be created with many elements in various locations and only those that are needed at a given time would be uncovered or accessed. With cushion backed carpet tiles that do not require adhesive, the configuration can be changed at will.

There has been a long felt need in the art for readily accessible floor elements yet the carpet tiles now available in the art require glue. If the carpet tiles available in the art are not glued, they tend to be unsightly due to their curl and cup parameters both of which are too large to use as free-lay carpet tile.

Another embodiment is illustrated in FIG. 23. In FIG. 23, the floor 650 comprises an element 652 which is an access hatch which is at least partially covered by an access carpet tile 654. The access hatch 652 can be used for any purpose commonly used in the art including, but not limiting to a safe, a track for wiring or other electrical connections, a track for plumbing, a drain to capture moisture, etc. The advantages are that the access carpet tile 654 blends in visually with the other carpet tiles 651 and does not disclose the location of the element, panel, hatch, or the like 652 unless so desired. The element may be smaller than a single carpet tile, as illustrated in FIGS. 22 and 23 or the element may include the entire area of a room being carpeted, as would be done with a raised floor, or any size therebetween.

One advantage of the present invention is the water or vapor permeability of the cushion backed carpet tile system. Prior art carpet tiles require the use of adhesives, as previously mentioned, to eliminate the problems associated with excessive cup and curl of the carpet tile and/or less than desired dimensional stability. The adhesive is spread over the entire floor thereby creating a vapor barrier between the floor and the carpet tile. If any moisture is trapped under the adhesive either at installation or from seepage such as is common on concrete floors, the adhesive may become dislodged or the water may cause mildew to propagate. The carpet tiles of the present invention do not require the adhesive and therefore do not require the use of a vapor barrier. The seams between carpet tiles, while visually obscured by the pile, allow vapor to transit through the tile without consequence. Therefore, if moisture is under the carpet tile it can be absorbed into the room air. Also, if desired, any moisture on the carpet surface can run out through the seam and be collected in a drain element as described in reference to FIG. 23. Therefore, the carpet tiles of the present invention provide a water permeable flooring system.

In accordance with one example of the present invention, no adhesive modular carpet tile samples of Example I below were tested using the test as described below.

| Test Method Conducted |
|---|
| ASTM D-5252 Hexapod Drum Tester |
| ISO/TR 10361 Hexapod Tumbler |
| Ratings Based on CRI TM-101 Photographic Scales |
| Aachener Test (DIN Standard 54318) |

Apparatus: Wira Instrumentation Hexapod Tumbler Carpet Tester

Procedure

The test specimen was subjected to the reported cycles of "Hexapod" tumbling, removing the specimen every 2,000 cycles for restoration by vacuuming.

An Electrolux upright vacuum cleaner (Discovery II) was used, making four (4) forward and backward passes along the length of the specimen.

The samples were assessed using daylight equivalent vertical lighting (1500 lux). Samples were viewed at an angle of 45 degrees from 1½ meter distance, judging from all directions.

The samples were also measured for pile height before and after testing to obtain a pile height retention value.

The test for dimensional stability, commonly referred to as the Aachener test, determines the change in size of a textile resulting from treatments such as heating, wetting and drying. Change is reported as a change in proportion of the dimensions of the test sample with normal climate changes as defined in DIN 50 014. A shrinking sample is reported as a negative (−) result and an enlargement is reported as a positive (+) result. As would be apparent it is most desirable to have a product with a test result of zero (0) indicating no dimensional change. The larger the absolute value of the sample the more dimensional changes occur. It is extremely critical for the present invention to have minimal dimensional changes as a result of changes in environment. If the carpet tiles shrink the seams become exposed and the appearance is unsightly. If the carpet tiles expand the seams bulge which is both unsightly and a tripping hazard. For the purposes of the present invention the tiles need dimensional stability as measured by Aachener test.

| TEST RESULTS | | |
|---|---|---|
| Number of Hexapod Cycles | 4000 | 12000 |
| Color Change | 3–4 | 3 |
| Pile Height Retention | 89.4% | 74.8% |
| Overall Appearance Change | 4 | 3 |

Key to Ratings
5 = Negligible or no change
4 = Slight change
3 = Moderate change
2 = Considerable change
1 = Severe change The invention may be further understood by reference to the following examples which are not to be construed as unduly limiting the invention which is to be defined and construed in light of the appended claims.

EXAMPLE I

A tufted carpet was produced by the apparatus, and process, illustrated and described in relation to FIG. 2. The carpet produced has the configuration illustrated and described in relation to FIG. 3A. The production parameters were as follows:

| | |
|---|---|
| Yarn | 15 ounces per sq. yd. nylon 6,6 loop pile continuous filament |
| Primary Backing | 4 ounces per sq. yd. nonwoven polyester |
| Pre-coat | 16 ounces per sq. yd. SBR Latex filled with 100 parts $CaCO_2$ |
| Hot Melt Adhesive | 42 ounces per sq. yd. modified polypropylene |
| Laminate Reinforcement | 2 ounces per sq. yd. Nonwoven glass with acrylic binder |
| Urethane Foam Coverage | 20 ounces per sq. yd. |
| Urethane Foam Density | 16 pounds per cubic foot |
| Backing Material | 4 ounces per sq. yd. Nonwoven (50% polypropylene, 50% polyester) |

EXAMPLE II

| | |
|---|---|
| Construction | Tufted, Textured Loop Pile |
| Face Fiber | 100% Milliken Certified WearOn ® Nylon |
| Soil Protectant | MilliGuard ® |
| Antimicrobial | BioCare ® |
| Dye Method | Millitron ® Dye Injection Printing |
| Gauge | 1/10 in. (39.4/10 cm.) |
| Rows | 14.4/in. (56.7/10 cm.) |
| Tufts | 143.9/sq. in. (2230.3/100 sq. cm.) |
| Standard Backing | PVC-Free UNDERSCORE ™ cushion |
| Nominal Total Thickness | 0.34 in. (8.6 mm) |
| Total Weight | 99.9 oz./sq. yd. (3,387.4 g./sq. m.) |
| Tile Size | 36 × 36 in. (914.4 × 914.4 mm) |
| Flammability (Radiant Panel ASTM-E-648) | ≧0.45 (Class I) |
| Smoke Density (NFPA-258-T or ASTM-E-662) | ≦450 |
| Methenamine Pill Test (CPSC FF-1-70 or ASTM D 2859) | Self-Extinguishing |
| Lightfastness (AATCC 16E) | ≧4.0 at 80 hrs. |
| Crocking (AATCC 165) | ≧4.0 wet or dry |
| Static Electricity (AATCC-134) 20% R.H., 70° F. | ≦3.5 KV |
| Dimensional Stability - Aachener test (DIN Standard 54318) | ≦0.2% |
| Recommended Traffic | Heavy Commercial |
| Recommended Maintenance | Millicare ® |
| CRI Indoor Air Quality | Product Type: 12200793 |

EXAMPLE III

| | |
|---|---|
| Construction | Tufted, Textured Loop Pile |
| Face Fiber | 100% Milliken Certified WearOn ® Nylon |
| Soil Protectant | MilliGuard ® |
| Antimicrobial | BioCare ® |
| Dye Method | Millitron ® |
| Gauge | 1/10 in. (39.4/10 cm.) |
| Rows | 14.4/in. (56.7/10 cm.) |
| Tufts | 143.9/sq. in. (2230.3/100 sq. cm.) |
| Standard Backing | PVC-Free UNDERSCORE ™ cushion |
| Nominal Total Thickness | 0.34 in. (8.6 mm.) |
| Total Weight | 99.9 oz./sq. yd. (3,387.4 g./sq. m.) |
| Tile size | 36 × 36 in. (914.4 × 914.4 mm.) |
| Flammability (Radiant Panel ASTM-E-648) | ≧0.45 (Class I) |
| Smoke Density (NFPA-258-T or ASTM-E-662) | ≦450 |
| Methenamine Pill Test (CPSCFF-1-770 or ASTM D 2859) | Self-Extinguishing |
| Lightfastness (AATCC 16E) | ≧4.0 at 80 hrs. |
| Crocking (AATCC 165) | ≧4.0 wet or dry |
| Static Electricity (AATCC-134) 20% R.H., 70° F. | ≦3.5 KV |
| Dimensional Stability - Aachener Text (DIN Standard 54318) | ≦0.2% |
| Recommended Traffic | Heavy Commercial |
| Recommended Maintenance | MilliCare ® |
| CRI Indoor Air Quality | Product Type: 12200793 |

Comfort Rating

1. Gmax—Gmax simulates footfall onto a surface. The measure is reported as multiples of "g" (gravities), or Gmax. The lower the value, the lower the force upon impact, and the more comfortable underfoot the product feels. The higher the value, the higher the force upon impact, and the less comfortable the carpet feels.

| Gmax Test Results | |
|---|---|
| Standard weight cushion-backed carpet tile | 116 |
| Low weight cushion backed carpet tile | 129 |
| Standard commercial broadloom without underlayment | 185 |
| Standard hardback carpet tile, such as Everwhere a PVC hardback | 227 |

Resilience Rating

Cushion Resilience—Cushion resiliency measures the rebound percent of a metal ball when dropped from a standard height. It shows the shock absorbing character of the cushion, which helps reduce visible wear of the carpet face. The higher the value, the higher the rebound percent, and the more resilient the cushion.

| Resilience Results | |
|---|---|
| Standard weight cushion backed carpet tile | 30 |
| Low weight polyurethane cushion back carpet tile | 27 |
| Standard commercial broadloom without underlayment | 17 |
| Standard hardback carpet tile | 13 |

Appearance Retention

Appearance Retention Rating (ARR)—the ARR value is determined by grading the appearance change of carpet subjected to exposure conditions in accordance with either the ASTM D-5252 (Hexapod) or ASTM D-5417 (Vettermann) test method using the number of cycles for short and long-term tests specified.

```
ARR—Light (short-term >/= 3.0, long-term >/= 2.5
ARR—Moderate (short-term >/= 3.5, long-term >/= 3.0
ARR—Heavy (short-term >/= 4.0, long-term >/= 3.5
```

The low weight modular carpet tile of the present invention had an APR of about 4.0 short term and 3.5 long term.

In the specification there has been set forth preferred embodiments of the invention, and although specific terms are employed, they are used in a generic and descriptive sense only and not for purpose of limitation, the scope of the invention being defined in the claims.

We claim:

1. A method of laying no adhesive cushion backed carpet tile on to a surface, comprising the steps of:
    a) reversibly securing at least one indicator carpet tile to said surface with a securing device or means;
    b) placing a second carpet tile on said surface wherein said second carpet tile and said indicator carpet tile abut;
    c) placing a third carpet tile on said surface wherein said third carpet tile abuts at least one of said indicator carpet tile and said second carpet tile;
    d) placing at least one subsequent carpet tile on said surface wherein said subsequent carpet tile abuts at least one of said indicator carpet tile, said second carpet tile and said third carpet tile;
    e) removing said indicator carpet tile and removing said securing device or means; and
    f) replacing said indicator tile or a carpet tile in a location vacated by said indicator carpet tile.

2. The method of laying no adhesive cushion backed carpet tile of claim 1 wherein said third carpet tile abuts said second carpet tile.

3. The method of laying no adhesive cushion backed carpet tile of claim 1 wherein said third carpet tile abuts said indicator tile.

4. The method of laying no adhesive cushion backed carpet tile of claim 1 wherein said subsequent carpet tile abuts said indicator tile.

5. The method of laying no adhesive cushion backed carpet tile of claim 1 wherein said subsequent carpet tile abuts said second carpet tile.

6. The method of laying no adhesive cushion backed carpet tile of claim 1 wherein said subsequent carpet tile abuts said third carpet tile.

7. The method of laying no adhesive cushion backed carpet tile of claim 1 wherein said subsequent carpet tile abuts said indicator carpet tile and said third carpet tile.

8. The method of laying no adhesive cushion backed carpet tile of claim 1 wherein said indicator tile is placed in substantially the center of the surface.

9. The method of laying no adhesive cushion backed carpet tile of claim 1 further comprising the step of repeating said step of placing additional subsequent carpet tile until said surface is substantially covered.

10. The method of laying no adhesive cushion backed carpet tile of claim 1 wherein each of said cushion backed carpet tile has a cup of about 3/16" or less and a curl of about 1/16" or less.

11. The method of laying no adhesive cushion backed carpet tile of claim 1 further comprising the step of treating said surface to enhance the coefficient of friction thereof.

* * * * *